(12) United States Patent
Jaenisch et al.

(10) Patent No.: US 11,340,603 B2
(45) Date of Patent: May 24, 2022

(54) BEHAVIOR MONITORING USING CONVOLUTIONAL DATA MODELING

(71) Applicant: Raytheon Company, Waltham, MA (US)

(72) Inventors: Holger M. Jaenisch, Toney, AL (US); James W. Handley, Decatur, AL (US)

(73) Assignee: Raytheon Company, Waltham, MA (US)

( * ) Notice: Subject to any disclaimer, the term of this patent is extended or adjusted under 35 U.S.C. 154(b) by 332 days.

(21) Appl. No.: 16/381,179

(22) Filed: Apr. 11, 2019

(65) Prior Publication Data

US 2020/0326695 A1    Oct. 15, 2020

(51) Int. Cl.
| | | |
|---|---|---|
| G06F 17/10 | (2006.01) | |
| G05B 23/02 | (2006.01) | |
| G06N 20/00 | (2019.01) | |
| G06F 30/20 | (2020.01) | |
| G06F 111/10 | (2020.01) | |

(52) U.S. Cl.
CPC ......... *G05B 23/0254* (2013.01); *G06F 30/20* (2020.01); *G06N 20/00* (2019.01); *G06F 2111/10* (2020.01)

(58) Field of Classification Search
CPC .... G05B 23/0254; G05N 20/00; G06F 30/20; G06F 2111/10
USPC ........................................................... 703/1
See application file for complete search history.

(56) References Cited

U.S. PATENT DOCUMENTS

| | | |
|---|---|---|
| 6,760,032 B1 | 7/2004 | James |
| 7,036,016 B1 | 4/2006 | Smith, Jr. |
| 8,839,417 B1 | 9/2014 | Jordan |
| 9,245,116 B2 | 1/2016 | Evans et al. |
| 10,110,629 B1 | 10/2018 | Kruse et al. |
| 10,326,796 B1 | 6/2019 | Varadarajan et al. |
| 10,507,973 B2* | 12/2019 | Park ....................... B65D 88/52 |
| 11,036,858 B2* | 6/2021 | Chistyakov ............ G06N 20/10 |
| 11,132,923 B2 | 9/2021 | Jaenisch et al. |
| 2003/0174895 A1 | 9/2003 | Hsieh |
| 2006/0101516 A1 | 5/2006 | Sudaharan et al. |
| 2007/0245119 A1 | 10/2007 | Hoppe |
| 2009/0241006 A1 | 9/2009 | Liikanen et al. |
| 2013/0145465 A1 | 6/2013 | Wang et al. |
| 2015/0100556 A1 | 4/2015 | Sekiguchi et al. |
| 2015/0131796 A1 | 5/2015 | Milsted |
| 2015/0154796 A1 | 6/2015 | Co |

(Continued)

FOREIGN PATENT DOCUMENTS

| | | |
|---|---|---|
| EP | 2942919 A1 | 11/2015 |
| WO | WO-2019199675 A1 | 10/2019 |

(Continued)

OTHER PUBLICATIONS

"U.S. Appl. No. 16/281,888, Notice of Allowance dated Oct. 20, 2020", 12 pgs.

(Continued)

*Primary Examiner* — Andre Pierre Louis

(74) *Attorney, Agent, or Firm* — Schwegman Lundberg & Woessner, P.A.

(57) ABSTRACT

Embedded convolutional data modeling is disclosed. A machine receives, as input, a plurality of data examples. The machine generates an embedded convolutional data model for the data examples. The machine outputs a source code for the model.

24 Claims, 10 Drawing Sheets

(56) References Cited

U.S. PATENT DOCUMENTS

| | | |
|---|---|---|
| 2015/0206315 A1 | 7/2015 | Price et al. |
| 2015/0295907 A1 | 10/2015 | Abrahamson |
| 2016/0321323 A1 | 11/2016 | Gaumnitz et al. |
| 2016/0359685 A1 | 12/2016 | Yadav et al. |
| 2016/0359886 A1 | 12/2016 | Yadav et al. |
| 2017/0149787 A1 | 5/2017 | Niemela et al. |
| 2017/0257396 A1 | 9/2017 | Shen et al. |
| 2017/0302691 A1 | 10/2017 | Singh et al. |
| 2017/0310690 A1 | 10/2017 | Mestha et al. |
| 2018/0027004 A1 | 1/2018 | Huang et al. |
| 2018/0204111 A1* | 7/2018 | Zadeh ............ G06K 9/3233 |
| 2018/0337935 A1 | 11/2018 | Marwah et al. |
| 2019/0018375 A1 | 1/2019 | Deshpande et al. |
| 2019/0149565 A1 | 5/2019 | Hagi et al. |
| 2019/0196746 A1 | 6/2019 | Fujimoto et al. |
| 2019/0279112 A1 | 9/2019 | Jaenisch et al. |
| 2019/0289034 A1 | 9/2019 | Erez et al. |
| 2019/0296913 A1 | 9/2019 | Verma et al. |
| 2019/0311120 A1 | 10/2019 | Jaenisch et al. |
| 2019/0312908 A1 | 10/2019 | Jaenisch et al. |
| 2019/0383874 A1 | 12/2019 | Jaenisch et al. |
| 2020/0202749 A1 | 6/2020 | Jaenisch et al. |
| 2020/0272731 A1 | 8/2020 | Jaenisch et al. |
| 2020/0273499 A1 | 8/2020 | Jaenisch et al. |

FOREIGN PATENT DOCUMENTS

| | | | |
|---|---|---|---|
| WO | WO-2019199769 A1 | 10/2019 | |
| WO | WO-2019199777 A1 | 10/2019 | |
| WO | WO-2020172122 A1 | 8/2020 | |
| WO | WO-2020172124 A1 | 8/2020 | |

OTHER PUBLICATIONS

"U.S. Appl. No. 16/379,154, Non Final Office Action dated Oct. 15, 2020", 25 pgs.

"U.S. Appl. No. 16/379,162, Non Final Office Action dated Nov. 10, 2020", 20 pgs.

"International Application Serial No. PCT/US2019/026338, International Preliminary Report on Patentability dated Oct. 22, 2020", 9 pgs.

"International Application Serial No. PCT/US2019/026514, International Preliminary Report on Patentability dated Oct. 22, 2020", 7 pgs.

"International Application Serial No. PCT/US2019/026522, International Preliminary Report on Patentability dated Oct. 22, 2020", 7 pgs.

"International Application Serial No. PCT/US2020/043434, International Search Report dated Oct. 16, 2020", 4 pgs.

"International Application Serial No. PCT/US2020/043434, Written Opinion dated Oct. 16, 2020", 5 pgs.

Deng, Song, et al., "Distributed intrusion detection based on hybrid gene expression programming and cloud computing in a cyber physical power system", IET Control Theory And Applications, The Institution Of Engineering And Technology, GB, vol. 11, No. 11, (Jul. 14, 2017), 1822-1829.

Elsayed, Saber, et al., "Evaluating the performance of a differential evolution algorithm in anomaly detection", IEEE Congress On Evolutionary Computation (CEC), IEEE, (May 25, 2015), 2490-2497.

Holnglei, Gao, et al., "A GEP-Based Anomaly Detection Scheme in Wireless Sensor Networks", Computational Science And Engineering, CSE '09. International Conference On, IEEE, Piscataway, NJ, USA, (Aug. 29, 2009), 817-822.

"U.S. Appl. No. 16/281,888, Examiner Interview Summary dated Aug. 10, 2020", 3 pgs.

"U.S. Appl. No. 16/281,888, Non Final Office Action dated May 19, 2020", 15 pgs.

"U.S. Appl. No. 16/281,888, Response filed Aug. 18, 2020 to Non Final Office Action dated May 19, 2020", 10 pgs.

"International Application Serial No. PCT/US2020/018570, International Search Report dated Apr. 28, 2020", 4 pgs.

"International Application Serial No. PCT/US2020/018570, Written Opinion dated Apr. 28, 2020", 7 pgs.

"International Application Serial No. PCT/US2020/018574, International Search Report dated Apr. 28, 2020", 4 pgs.

"International Application Serial No. PCT/US2020/018574, Written Opinion dated Apr. 28, 2020", 7 pgs.

"U.S. Appl. No. 16/265,526, Response filed Oct. 11, 2021 to Non Final Office Action dated Jul. 12, 2021", 9 pgs.

"U.S. Appl. No. 16/379,154, Amendment & Response Under 37 C.F.R. § 1.116 filed Sep. 29, 2021", 11 pgs.

"U.S. Appl. No. 16/522,235, Examiner Interview Summary dated Nov. 10, 2021", 2 pgs.

"U.S. Appl. No. 16/522,235, Response filed Nov. 16, 2021 to Non Final Office Action dated Aug. 16, 2021", 9 pgs.

"International Application Serial No. PCT/US2019/026338, International Search Report dated Jun. 21, 2019", 5 pgs.

"International Application Serial No. PCT/US2019/026338, Written Opinion dated Jun. 21, 2019", 7 pgs.

"International Application Serial No. PCT/US2019/026514, International Search Report dated Jul. 5, 2019", 5 pgs.

"International Application Serial No. PCT/US2019/026514, Written Opinion dated Jul. 5, 2019", 8 pgs.

"International Application Serial No. PCT/US2019/026522, International Search Report dated Jul. 8, 2019", 4 pgs.

"International Application Serial No. PCT/US2019/026522, Written Opinion dated Jul. 8, 2019", 5 pgs.

Farlow, Stanley, "The GMDH Algorithm of Ivakhnenko", The American Statistician, vol. 35, No. 4, (1981), 210-215.

Ferreira, Candida, "Gene Expression Programming in Problem Solving", Soft Computing and Industry, (2002), 635-653.

Ferreira, Candida, "Gene Expression Programming: A New Adaptive Algorithm for Solving Problems", Complex Systems, vol. 13, issue 2, (2001), 22 pgs.

Gabor, D, et al., "A Universal Non-linear filter, predictor and simulator which optimizes", The Institution of Electrical Engineers, Paper No. 3270 M, (1960), 422-435.

Ivakhnenko, A G, "Heuristic Seif-Organization in Problems of Engineering Cybernetics", Automatica, vol. 6, (1969), 207-219.

Ivakhnenko, A G, et al., "The Review of Problems Solvable by Algorithms of the Group Method of Data Handling (GMDH)", Pattern Recognition and Image Analysis, vol. 5, No. 4, (1995), 527-535.

Jaenisch, H, et al., "Generalized information fusion and visualization using spatial voting and data modeling", Society of Photo-Optical Instrumentation Engineers SPIE Proceedings vol. 8756 No. 875609, (May 2013), 16 pgs.

Jaenisch, Holger, et al., "A novel application of data modeling for extracting mathematical ontologies and relationship matrix features from text documents", SPIE Defense + Commercial Sensing, (2005), 12 pgs.

Jaenisch, Holger, et al., "A robust regularization algorithm for polynomial networks for machine learning", Proc. SPIE 8059, Evolutionary and Bio-Inspired Computation: Theory and Applications V, 80590A, (May 2011), 21 pgs.

Jaenisch, Holger, et al., "Autonomous Journaling Response Using Data Model LUTS", Proc. of SPIE vol. 7344, (2009), 11 pgs.

Jaenisch, Holger, "Converting data into functions for continuous wavelet analysis", Proceedings of SPIE—The International Society for Optical Engineering, (pp. 2-13), (2009), 13 pgs.

Jaenisch, Holger, "Data Modeling Applications in Space Science and Astronomy", PhD thesis, James Cook University (pp. 1-130 of 255 pages total), (2009), 130 pgs.

Jaenisch, Holger, "Data Modeling Applications in Space Science and Astronomy", PhD thesis, James Cook University (pp. 131-256 of 255 pages total), (2009), 126 pgs.

Jaenisch, Holger, et al., "Data Modeling for Change Detection of Inventory Flow and Instrument Calibration", Proceedings of SOLE, (2003), 10 pgs.

Jaenisch, Holger, et al., "Data Modeling for Fault Detection", MFPT, (2003), 10 pgs.

(56) References Cited

OTHER PUBLICATIONS

Jaenisch, Holger, et al., "Data Modeling for network dynamics", Proceedings of SPIE—The International Society for Optical Engineering, (2004), 12 pgs.

Jaenisch, Holger, et al., "Data Modeling for Predictive Behavior Hypothesis Formation and Testing", Proc. SPIE 6241, Data Mining, Intrusion Detection, Information Assurance, and Data Networks Security, (2006), 12 pgs.

Jaenisch, Holger, et al., "Data-modeling-enabled guidance, navigation, and control to enhance the lethality of interceptors against maneuvering targets", Proceedings of SPIE—The International Society for Optical Engineering • (Mar. 2005), 13 pgs.

Jaenisch, Holger, et al., "Digital MicroArray Analysis For Digital Artifact Genomics", Cyber Sensing, (2013), 20 pgs.

Jaenisch, Holger, "Entropyology: Microarray Analysis Analogy for Digital Artifact Discrimination", Proceedings of SPIE, vol. 8359, (2012), 20 pgs.

Jaenisch, Holger, "Geospatial Feature Based Automatic Target Recognition (ATR) using data models", Proceedings vol. 7697, Signal Processing, Sensor Fusion, and Target Recognition XIX, (2010), 12 pgs.

Jaenisch, Holger, et al., "Insider Threat Detection Enabled by Converting User Applications into Fractal Fingerprints and Autonomously Detecting Anomalies", SPIE Proceedings vol. 8408, (2012), 22 pgs.

Jaenisch, Holger, et al., "Performance Comparison of the Prophecy (Forecasting) Algorithm in FFT Form for Unseen Feature and Time-Series Prediction", Proc. SPIE 8757, Cyber Sensing, (2013), 30 pgs.

Jaenisch, Holger, et al., "Shai-Hulud The quest for worm sign", Proc. SPIE 5812, Data Mining, Intrusion Detection, Information Assurance, and Data Networks Security, (2005), 9 pgs.

Jaenisch, Holger, et al., "Spatial Voting For Automatic Feature Selection, Fusion and Visualization", Proc. SPIE 8756, Multisensor, Multisource Information Fusion: Architectures, Algorithms, and Applications, (2013), 21 pgs.

Jaenisch, Holger, "Spatial Voting with Data Modeling", Sensor Fusions and its Applications, (2010), 153-178.

Jaenisch, Holger, et al. "Virtual Instrument Prototyping with Data Modeling", (2003), 15 pgs.

Kamalika, Bhattacharjee, et al., "A Survey of Cellular Automata: Types, Dynamics, Non-uniformity and Applications", Arxiv.Org, Cornell University Library, 201 Olin Library Cornell University Ithaca, NY, (Jul. 8, 2016).

Oltean, Mihai, et al., "An autonomous GP-based system for regression and classi?cation problems", Applied Soft Computing 9, (2009), 49-60.

U.S. Appl. No. 16/297,202, filed Mar. 8, 2019, Machine Learning Technique Selection and Improvement.

U.S. Appl. No. 16/265,526, filed Feb. 1, 2019, Device Behavior Anomaly Detection.

U.S. Appl. No. 16/379,154, filed Apr. 9, 2019, Cyber Chaff Using Spatial Voting.

U.S. Appl. No. 16/379,162, filed Apr. 9, 2019, Encryption Using Spatial Voting.

U.S. Appl. No. 16/522,235, filed Jul. 25, 2019, Gene Expression Programming.

U.S. Appl. No. 16/554,206, filed Aug. 28, 2019, Alternative Techniques for Design of Experiments.

U.S. Appl. No. 16/281,888, filed Feb. 21, 2019, Anomaly Detection With Reduced Memory Overhead.

U.S. Appl. No. 16/281,922, filed Feb. 21, 2019, Anomaly Detection With Adaptive Auto Grouping.

* cited by examiner

BEHAVIOR MONITORING USING CONVOLUTIONAL DATA MODELING

TECHNICAL FIELD

Embodiments regard behavior monitoring. Some embodiments can be implemented on an embedded device due to the efficiency of behavior monitoring solutions.

BACKGROUND

Modeling a system state may be challenging as different conditions of the system may correspond to different relationships between variables, which may be difficult to predict. Deriving a model to predict a system state using analytical equations of system variables may be desirable. Current solutions to Data Modeling are woefully incapable of modeling complex system behavior, such as systems with data greater than order 8

SUMMARY

Figure 1:
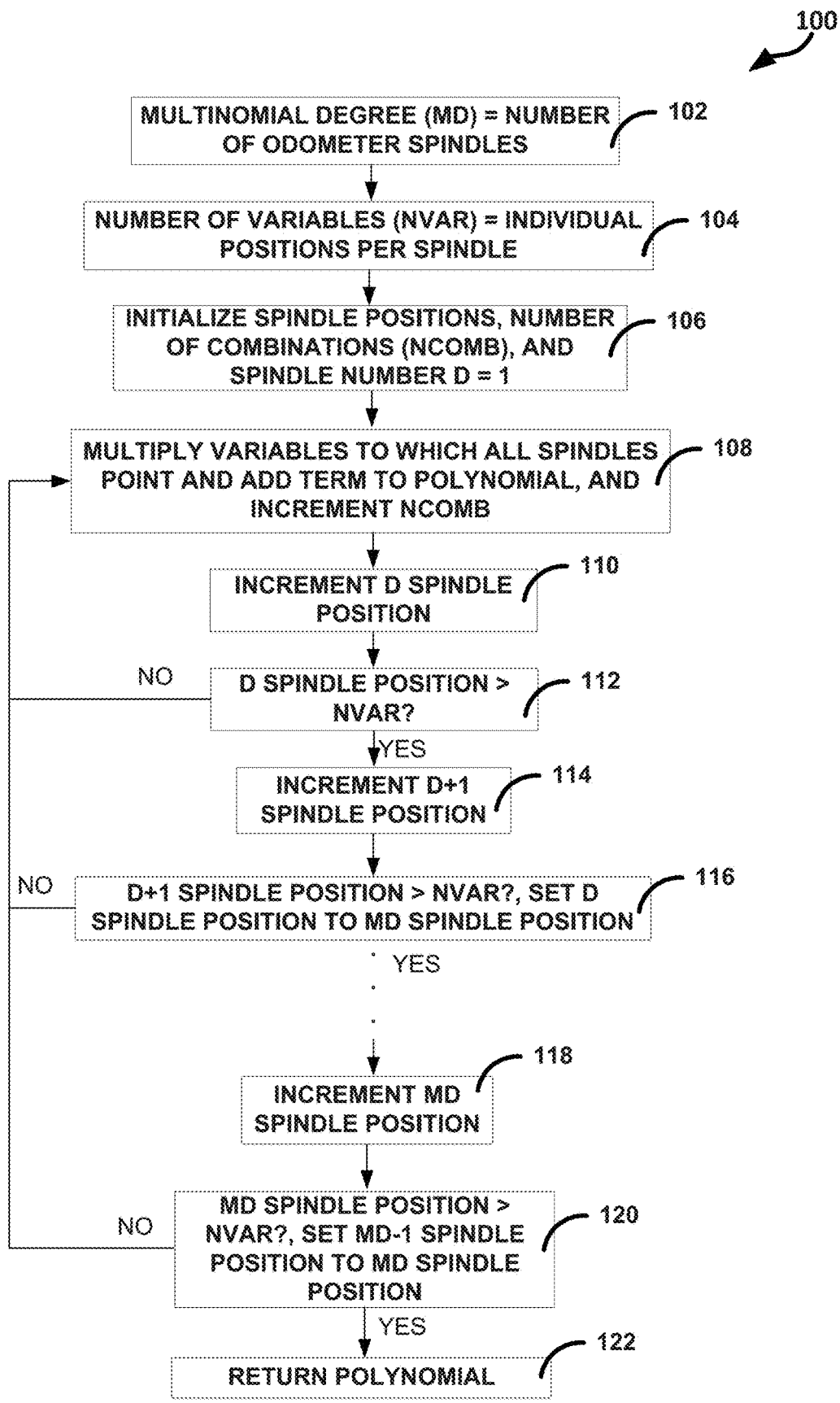
FIG. 1 illustrates, by way of example, a diagram of an embodiment of an odometer technique for generating a complete polynomial.

The present disclosure generally relates to behavior monitoring using information theoretic methods (ITM). Embodiments can be implemented in embedded computational hardware due to the low memory space and low processor bandwidth requirements. Embodiments can be applied to formal analytical methods for inverse system modeling, inverse parameter estimation, or system of systems emulation/simulation, among many other data modeling applications. Embodiments present instantiations specifically tailored to enable instantiations in graphical processing unit (GPU), field programmable gate array (FPGA), application specific integrated circuit (ASIC), hybrid metamaterial, or optical computational hardware, or the like. The following means and methods illustrate how the goals of modern Machine Learning (ML) methods can be achieved without the pitfalls and high memory or processor bandwidth costs of the ML techniques.

To accomplish this, ITM are used in lieu of statistical and probability based methods. This helps assure analytical bounded properties are leveraged and maintained. All decision aides and processes derived by embodiments avoid the ML method limitations and pitfalls of Wolpert's No Free Lunch (NFL) theorem when used for data and system behavior explanation, rather than an optimization based strategy for obtaining equal error rate based approximation estimators with confidence intervals.

Embodiments enable a device to have abductive reasoning achieved with self-organizing partial explainers, explaining all results obtained to date as a formal and testable mathematical hypothesis. This allows working with a fixed specificity of one (1) while allowing sensitivity to vary and grow as is required to explain all data.

This is in contrast with ML methods that strive to achieve equal error rates and a balance between specificity and sensitivity, thereby nearly assuring every generated answer is wrong (e.g., by some variable amount). Further, ML methods are incapable of declaring when new data cases are outside of the bounds of relevance of the underlying conjectured decision making architecture. Embodiments do not suffer from these issues and are capable of determining when a new data case is outside the bounds of relevance of the architecture.

Embodiments are strictly defined in mathematical terms. In embodiments, a self-organizing data-driven set of equations that explain all presently observed data can be autonomously discovered. The equations can be non-relevant to a newly encountered set of one or more observation measurements. This ability for the computational model to be self-aware of new unknown-unknown data (being like the self-defined hypothesis or unrelated to it) makes embodiments unique, scalable, and maintainable with performance bounds directly computable by formal analysis of the mathematical structure.

The small footprint of embodiments, in terms of memory and computation requirements, enables reduction to practice with fast and efficient techniques that are not afforded to deep learning convolutional neural networks (DCNN) and similar structures that are based on hyper-parameterization.

According to some aspects of the technology described herein, an apparatus includes processing circuitry and memory. The processing circuitry receives, as input, a plurality of data examples. The processing circuitry sets a layer number to a first layer (e.g., 1 for simplicity). The processing circuitry, while the layer number is less than or equal to a maximum layer number and while a previously unselected variable combination in a layer corresponding to the layer number is available, selects a variable in a layer corresponding to the layer number; computes a multivariable linear regression for the currently selected variable; if a RSS (residual sum of squares) error for the multivariable linear regression is less than that for at least one of a best M variables, adds the selected variable to the best M variables, wherein M is a positive integer; and runs a test of the RSS error against stopping criteria; upon passing the test outputs a source code for a model based on the best M variables and a complete polynomial Stopping criteria can include: 1) a best explanation comprised entirely of previous layer's best explainers yielding best use of available variables to explain target yielding minimum residual variance (may require higher order cofactor driven explanation or tradition Bayesian estimation).

That is the stopping criteria can include a point where only previous layer variables (no original input variables in raw form) are contained in the current best estimate of the output data (e.g., L4O1=f(L3O1, L3O2, L3O3), layer four object one is a function of only layer object variables and no raw variables); 2) reach RSS error less than or equal to standard deviation of target variable, then the explanatory variables are sufficient to continue deriving explanatory hypotheses (sufficiency criteria); 3) RSS error less than or equal to standard deviation of target variable divided by the number of samples equals information theoretic stopping point for full explanation (any residual is unexplainable from system measurements and should be inspected to determine anomalous causes); 4) if the minimum of the max error is less than or equal to 4 in the second decimal place to the right of the highest precision decimal place (for example, for 4 decimal places, the would be a 4 in the 4+2=$6^{th}$ decimal place); 5) total number of layers exceeded, theoretical upper bound for number of layers is expected to not exceed the square root of the number of samples times the number of variables.

Other aspects include a method to perform the operations of the processing circuitry above, and a machine-readable medium storing instructions for the processing circuitry to perform the above operations.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

A Kolmogorov-Gabor (KG) polynomial is shown in Equation 2. Models resulting from use of the KG polynomial are known as polynomial neural networks.

$$Y(x_1, \ldots, x_n) = a_0 + \sum_{i=1}^{n} a_i x_i + \sum_{i=1}^{n} \sum_{j=i}^{n} a_{ij} x_i x_j + \sum_{i=1}^{n} \sum_{j=i}^{n} \sum_{k=j}^{n} a_{ijk} x_i x_j x_k + \ldots \quad \text{Equation 2}$$

For modeling using GMDH, first, the number of inputs for each neuron, polynomial power, and input sources of layers after the first layer are decided. Then, the design process begins from the first layer and goes on. All possible combinations of allowable inputs (all possible neurons) are considered.

Drawbacks of the GMDH approach include using truncated functions, not full polynomials. The truncated functions add to the inaccuracy of the GMDH approach. The GMDH does not prune models and instead brings all terms from a previous layer forward. This creates a data explosion. Further, GMDH is used in a traditional ML sense to get an error rate, rather than a full explanation of data.

FIG. 1 illustrates, by way of example, a diagram of an embodiment of a flow chart for an odometer method 100 for generating a complete polynomial of a specified order. In some instantiations, the odometer method 100 creates n-variable complete polynomials of a specified order. The method 100 is implemented at one or more computing machines, for example, the computing machine 1000.

Figure 2:
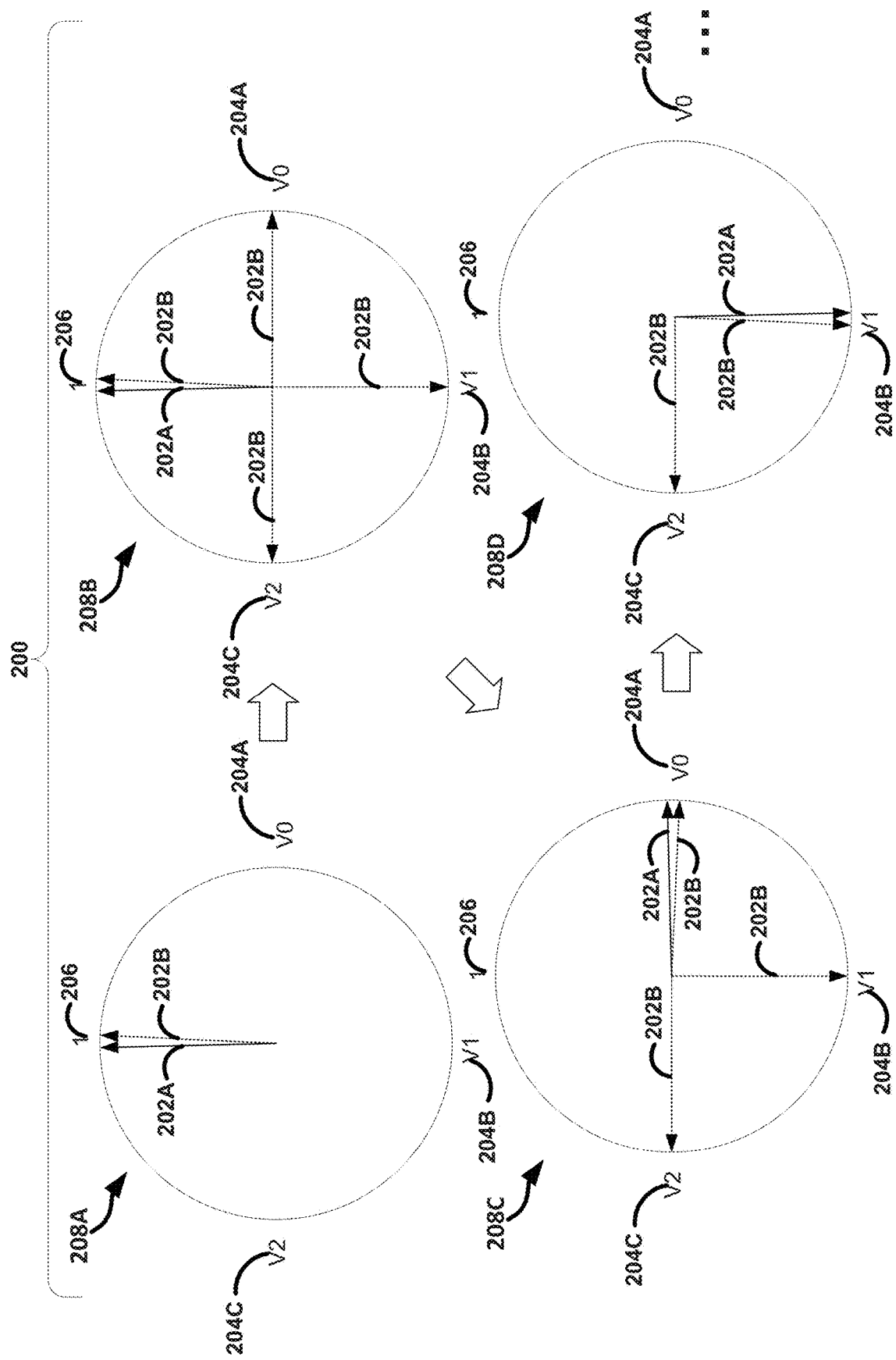
FIG. 2 illustrates, by way of example, another diagram of an embodiment of an odometer technique for generating a complete polynomial.

At operation 102, the computing machine 1000 receives a multinomial degree (MD), which may be represented as a number of odometer spindles 202 (see FIG. 2). Spindles refer to spindles of an odometer in a car with spindles for hundred-thousands, ten-thousands, thousands, hundreds, tens, and singles of miles. The MD can be, for example, two (2), three (3), or a greater integer.

At operation 104, the computing machine 1000 receives a number of variables (NVAR). The NVAR may be represented as a number of individual positions per spindle. The NVAR can be an integer greater than one (1). A number of variables 204 (see FIG. 2) that line an odometer 208 (see FIG. 2) can be equal to NVAR.

At operation 106, the computing machine 1000 can generate the odometer 208 (see FIG. 2). Generating the odometer 208 can include initializing the spindle 202 positions (the variables 204 to which the respective spindle 202 points) can be initialized. The operation 106 can include setting the number of combinations (Ncomb) to one. Ncomb counts the number of terms in a polynomial generated using the odometer method 100. In the created odometer, each spindle represents a degree of the multinomial, and each individual position on each spindle corresponds to a variable.

At operation 108, all variables to which the spindles 202 point are multiplied with each other and a resulting term is added to the polynomial. At operation 110, the position of the most minor spindle is incremented. The most minor spindle is the one that moves the most. Consider a clock with a second hand, minute hand, and hour hand. The most minor spindle would be the second hand and the most major spindle would be the hour hand.

At operation 112, it is determined whether the spindle position of the most minor spindle is greater than NVAR. If the spindle position is less than NVAR, the method 100 continues at operation 108. If the most minor spindle position is greater than NVAR, the spindle position of the next most minor spindle (the D+1 spindle in the example of FIG. 1) is incremented at operation 114.

At operation 116, the most minor spindle is set to the position of the most major spindle (the MID spindle) and it is determined whether the next most minor spindle position is greater than NVAR. If the next most minor spindle position is less than (or equal to) NVAR the method 100 continues at operation 108. If the next most minor spindle position is greater than NVAR, the method 100 continues with operations similar to operations 114 and 116 with spindles of increasing strength until all but the position of the most major spindle have been incremented NVAR times. At this point, the most major spindle is incremented in position at operation 118.

At operation 120, it is determined whether the most major spindle position is greater than NVAR. If the most major spindle position is less than (or equal to) NVAR, the method 100 continues at operation 108. If the most major spindle position is greater than NVAR, the method 100 is complete and the generated polynomial is provided at operation 122.

FIG. 2 illustrates, by way of example, a diagram of an embodiment of the operations of the method 100. FIG. 2 is intended to help explain the odometer technique described regarding FIG. 1. The diagram 200 includes two spindles 202A, 202B and three variables 204A, 204B, 204C on an odometer 208. Other numbers of spindles 202 and variables 204 are possible. Two spindles and three variables are merely convenient for explanatory purposes.

The odometer 208A is in a position after initialization (e.g., operations 102, 104, 106). The odometer 208B illustrates operations 108, 110, 112. A function after the odometer 208B in this example includes 1+V0+V1+V2.

The odometer 208C illustrates operations 114, 116 and subsequent operations 108, 110, 112. The spindle 202A is incremented and the spindle 202B is looped across the remaining variables (or identity) to which the spindle 202A has not yet pointed. After these operations, the function in this example includes 1+V0+V1+V2+V0V0+V0V1+V0V2.

The odometer 208D illustrates subsequent operations 114, 116 and subsequent operations 108, 110, 112. The spindle 202A is incremented and the spindle 202B is looped across the remaining variables (or identity) to which the spindle 202A has not yet pointed. After the third instance of the operations 114, 116 and subsequent operations 108, 110, 112, the polynomial in this example includes 1+V0+V1+V2+V0V0+V0V1+V0V2+V1V1+V1V2. The function generated can be referred to as an object of a layer. In this example, this function can be layer 1, object 1 ("L1O1"). Multiple objects can be generated for each layer.

The method 100 continues until only one additional term is added to the function. The function after the odometer technique illustrated in FIGS. 1 and 2 completes is 1+V0+V1+V2+V0V0+V0V1+V0V2+V1V1+V1V2+V2V2. This is a full, second order, multivariate polynomial on the variables V0, V1, and V2.

Note that the method 200 is only for a second order polynomial. A third order polynomial would use the operations 118, 120.

Figure 3:
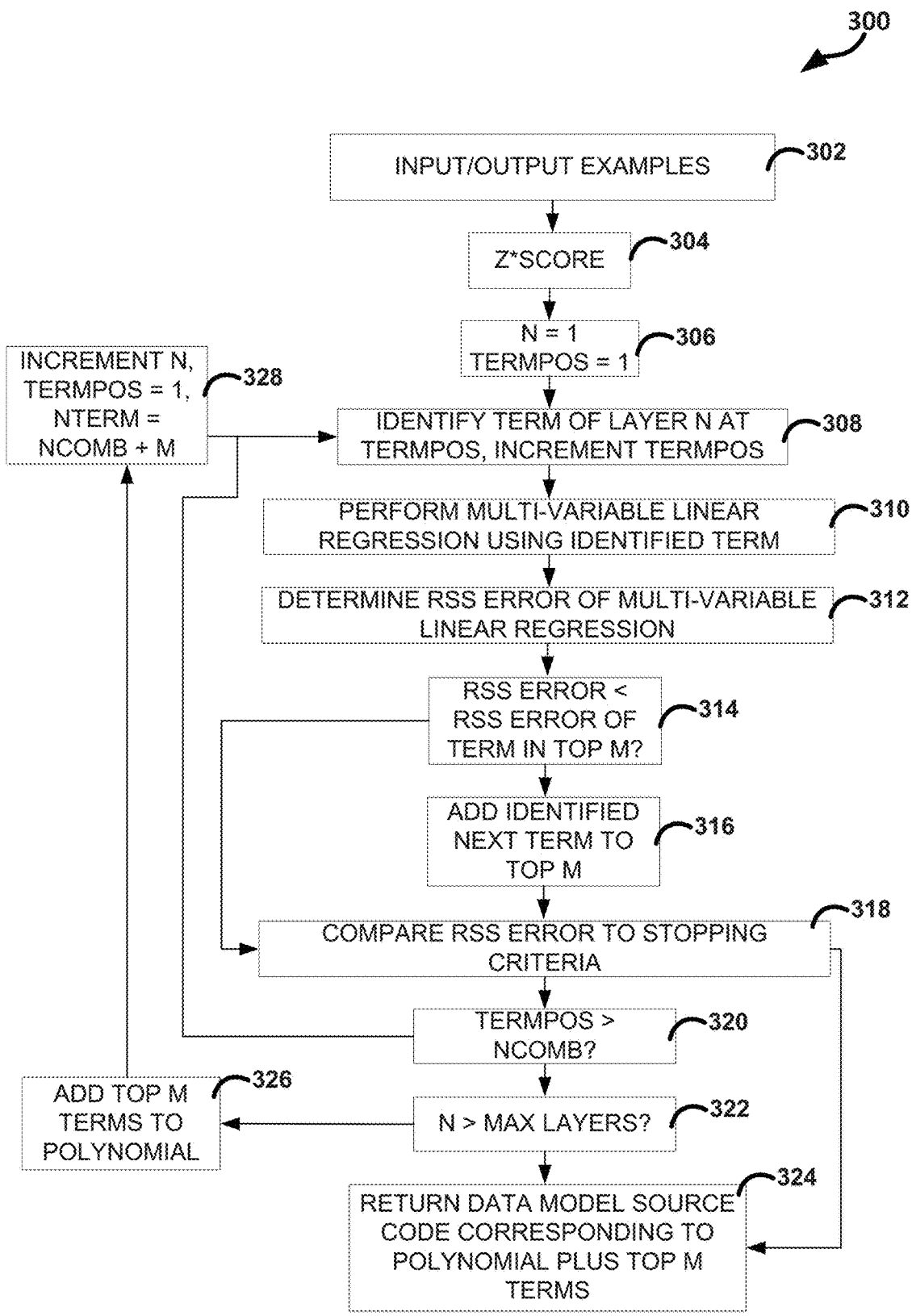
FIG. 3 illustrates, by way of example, a diagram of an embodiment of a method of Data Modeling.

FIG. 3 is a flow chart for a method 300 of Data Modeling, in accordance with some embodiments. The method 300 is implemented at one or more computing machines, for example, the computing machine 100.

At operation 302, the computing machine receives, as input, a plurality of data examples (e.g. input/output (I/O) pairs).

At operation 304, the computing machine computes a modified Z-score (z*-score) for the data examples (or a portion of the data examples). The z*-score is computed as (value−mean)/average deviation (versus standard deviation that is used to compute the standard Z-score). The value is the value of the data example. The mean is the mean of the data example values. The average deviation is calculated according to:

$$\text{Average Deviation} = \sum_{i=1}^{K} |x_i - \mu| / K$$

In the above equation, there are K data examples $x_i$ for i=1 to K. The value $\mu$ represents the mean of the K data examples $x_i$.

At operation 306, the computing machine sets a layer number (N) to one. At operation 308, the computing machine proceeds to the $N^{th}$ layer. At operation 310, the computing machine calculates a next variable or metavariable from the data examples in a layer corresponding to the layer number. The variable combination can include one or more variables or metavariables from the function generated by the method 200. A variable or metavariable in the function is any entry between plus signs. For the example of the function generated and described regarding FIG. 3, the variables are V0, V1, and V2, and metavariables (combinations of variables) are V0V0, V0V1, V0V2, V1V1, V1V2, and V2V2. Any of the variables and metavariables can be used up to the entire layer object.

At operation 312, the computing machine computes a multivariable linear regression for the currently selected variable.

At operation 314, the computing machine determines whether a residual sum of squares (RSS) error for the multivariable linear regression is less than that for at least one of a best M variables (or metavariables) to carry to the next layer. M is a predetermined positive integer, such as three (3) or other positive integer. If the RSS error is less than that for at least one of the best M variable combinations, the method 300 continues to operation 316. Otherwise, the method 300 skips operation 316 and continues to operation 318.

At operation 316, upon determining that the RSS error is less than that for at least one of the best M variable combinations, the computing machine adds the currently selected variable combination to the best M variable combinations (possibly replacing the "worst" of the best M variable combinations, i.e., the one having the largest RSS error).

At operation 318, the computing machine tests the RSS error against stopping criteria. Any predetermined stopping criteria may be used. The stopping criteria may be the RSS error being less than a standard deviation of the output variable in the data examples. Alternatively, the stopping criteria may be the RSS error being less than a standard deviation of the output variable in the data examples divided by the number of samples for that output variable. Alternatively, the stopping criteria may be one or more (e.g., all) of the best M variable combinations being a function of previous layer outputs. If the test is passed, the method 300 continues to operation 324. If the test is failed, the method 300 continues to operation 320.

At operation 320, upon determining that that the test is failed, the computing machine determines whether each and every one of the variable combinations has been used. If so, the method 300 continues to operation 322. If not, the method 300 returns to operation 310.

At operation 322, upon determining that each and every one of the variable combinations has been used, the computing machine determines whether N is greater than or equal to the total number of layers. If so, the method 300 continues to operation 324. If not, the method 300 continues to operation 326.

At operation 324, upon determining that N is greater than or equal to the total number of layers, the computing machine outputs the model source code. An example of the outputted source code appears in Appendix B. After operation 324, the method 300 ends.

At operation 326, upon determining that N is less than the total number of layers, the computing machine provides the best M variables as input to the next layer.

At operation 328, the computing machine increments N by one to allow for processing of the next layer. After operation 328, the method 300 returns to operation 308.

Figure 4:
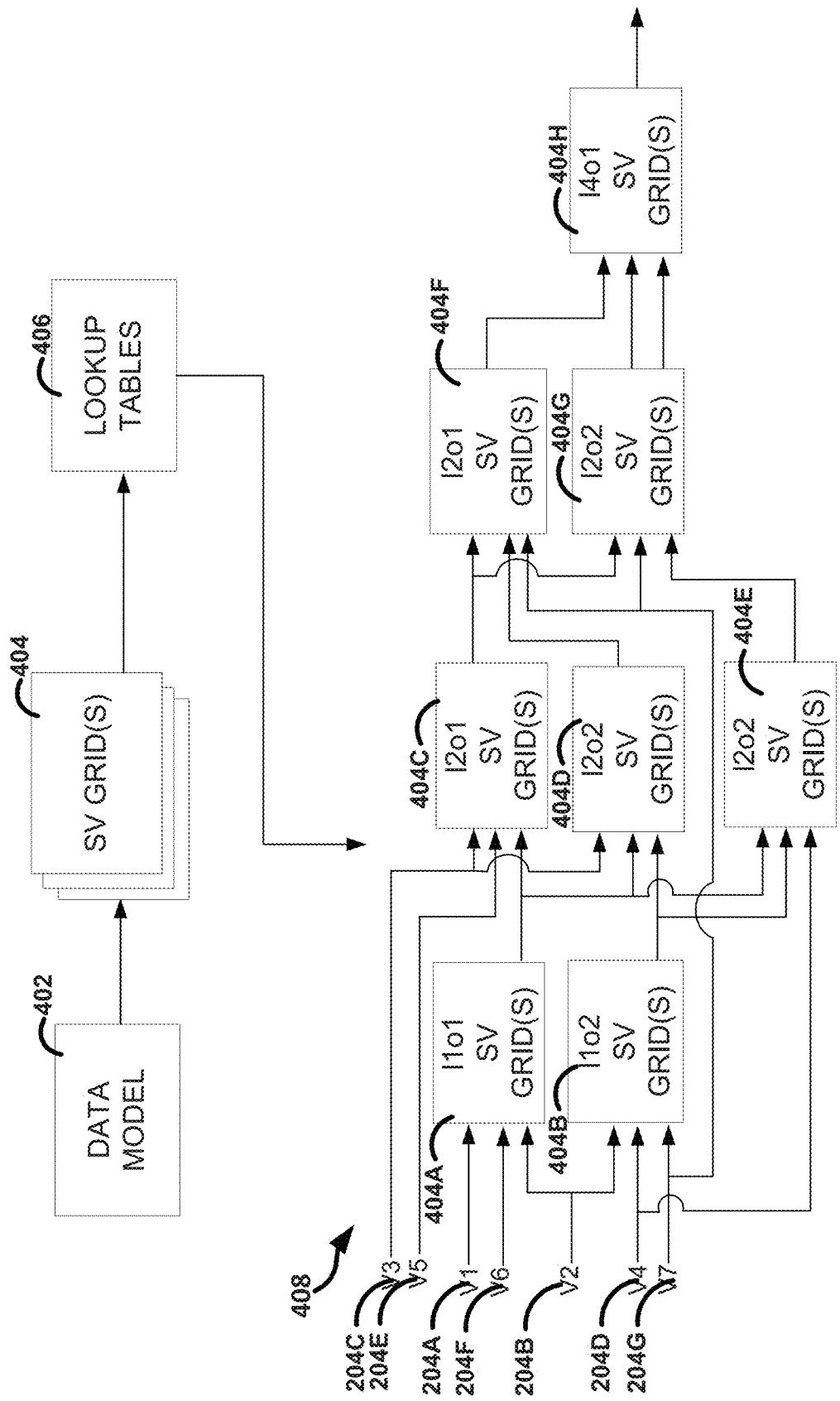
FIG. 4 illustrates, by way of example, a diagram of an embodiment of a method for implementing the Data Model using lookup tables, or otherwise in an embedded device.

FIG. 4 illustrates, by way of example, a flow diagram of an example of a method 400 for device behavior monitoring on a memory limited or a processor limited device. The method 400 as illustrated includes generating a data model, at operation 402. The Data Model can be generated using one or more of the techniques illustrated and described regarding FIGS. 1-3. The data model can indicate device behavior as described by two or more variables (e.g., at least one input and at least one output). The output is the behavior being modelled. At operation 404, the data model generated at operation 402 can be converted to one or more spatial voting (SV) grids. For more detail regarding SV grid, see FIGS. 5-8. In general, the output of the data model can be classified into a number of classes of outputs. Two or more feature values (described with regard to FIGS. 5-8) can be determined for one or more inputs. Two of the features can be plotted against each other on a grid of cells (SV grid). Each of the cells can have a corresponding key value associated therewith and each key value can be associated with one or more classes of outputs. Thus, each feature value combination can be associated with a corresponding class. These associations can be recorded in one or more lookup tables (LUTs), at operation 406.

A device with sufficient memory can use the SV grids, at operation 404 or the LUTs, at operation 406. However, in some cases, the memory requirements of such instantiations can be too high for some devices. In such embodiments, the LUTs or SV grids can be implemented at a fabric (semiconductor) level, at operation 408. That is, electrical or electronic components can be arranged and electrically coupled to perform the operations of the SV grids or the LUTs. The electrical or electronic components can include one or more transistors, resistors, capacitors, diodes, inductors, logic gates (AND, OR, XOR, negate, buffer), switches, multiplexers, power supplies, buses, analog to digital converters, digital to analog converters, or the like. By implementing at the silicon level, reverse engineering efforts can be stymied, such as by altering (e.g., destroying) the semiconductor when x-rayed.

A device 408 includes inputs 204A, 204B, 204C, 204D, 204E, 204F, and 204G. the inputs are propagated to SV grids generated at operation 404. The SV grids represent the layer object functions generated by the methods 100-300. The SV grids map features of the inputs to cells and provide corresponding key values (or features of the inputs) to the next layer. The device 408 propagates inputs 204 to a final SV grid that generates a single key value (or features), that is used to determine whether the device behavior is anomalous or recognized. A recognized behavior can be further categorized as adversarial (associated with malicious activity, a fault in the device 408 or the like) or normal. In this way, a device with limited processing capacity or memory can perform device behavior monitoring. This is enabled in part by the very accurate data model generated by the method 100, 200, 300.

Figure 5:
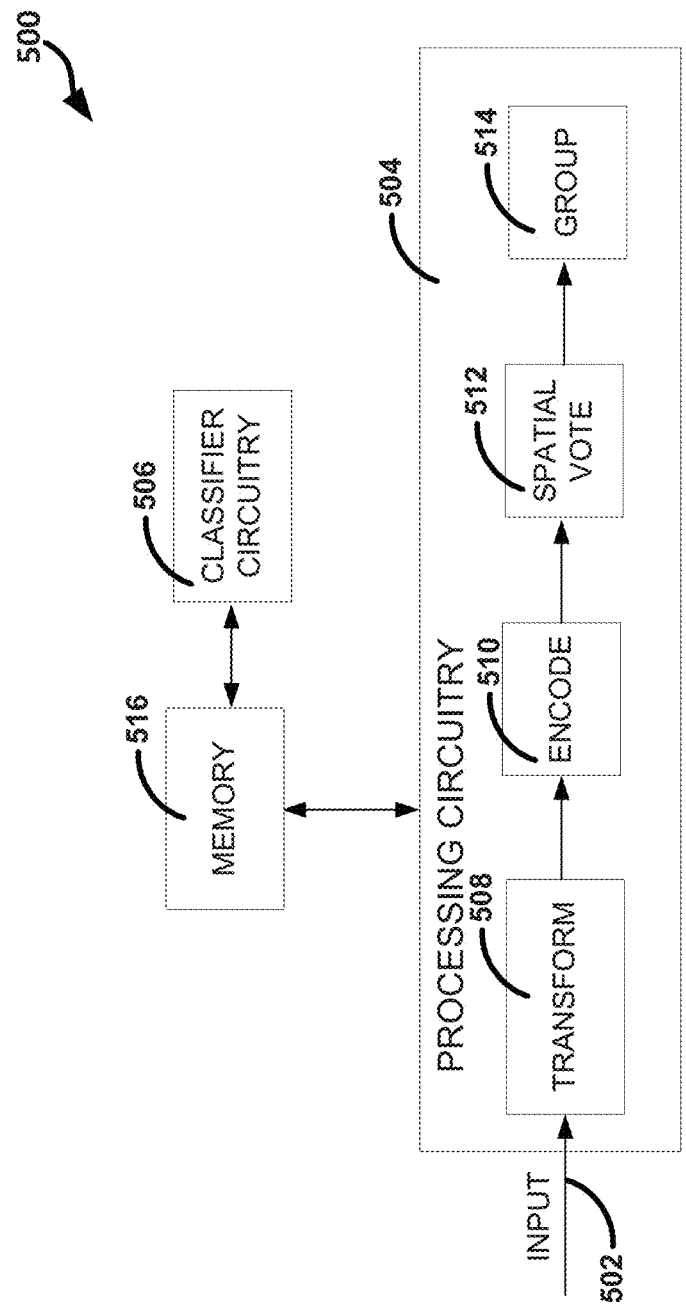
FIG. 5 illustrates, by way of example, a diagram of an embodiment of a system for anomaly detection.

FIG. 5 illustrates, by way of example, a diagram of an embodiment of a system 500 for anomaly detection. The system 500 as illustrated includes processing circuitry 504, classifier circuitry 506, and a memory 516. The processing circuitry 504 can identify an anomaly (a behavior that has not been seen by the processing circuitry 504 up to the point the behavior is seen). The classifier 506 can present the anomaly to a user for action, adjust SV grid parameters, or the like. The memory 516 can store key values, SV grid parameters, or other data input or output from the processing circuitry 504.

The processing circuitry 504 receives input 502. The input 502 can include binary data, text, signal values, image values, or other data that can be transformed to a number. The processing circuitry 504 can transform the input 502 to a number, at operation 508. The operation 508 can include encoding the input into a specified format, parsing the data into chunks (e.g., chunks of a specified size), or the like. For example, the operation 508 can include encoding text input to an American Standard Code for Information Interchange (ASCII) encoding to transform the input 502 into numbers between zero (0) and two hundred fifty-five (255). In another example, the operation 508 can include converting chunks of binary data to their numerical equivalent, such as two's complement, unsigned integer, floating number (e.g., short or long), or the like. In yet another example, the operation 508 can include performing an analog to digital conversion on analog signal data, such as by an analog to digital converter. In yet another example, the operation 508 can include combining red, green, blue (RGB) values of a color image, or the like, to generate a number. Not all input 502 needs to be transformed, thus the operation 508 is optional.

The processing circuitry 504 can receive numbers either as raw input 502 or from the operation 508 and encode the numbers into two features (discussed below) at operation 510. The operation 510 is order-sensitive, such that the same inputs received in a different order encode (likely encode, such as with greater than 95% confidence) to different features.

Examples of features include RM, RS, SM, SS, TM, TS, OC1, OC2, and OCR (discussed below). These calculations are performed in the sequence shown so that they can be calculated in a single pass across the data element where a value derived by an earlier step is used in an antecedent step directly and all calculations are updated within a single loop. RM can be determined using Equation 1:

$$RM_i = (RM_{i-1} + X_i)/2 \qquad \text{Equation 1}$$

In Equation 1, $X_i$ is the ith input value for i=1, 2, ... n. RS can be determined using Equation 2:

$$RS_i = \left(RS_{i-1} + \sqrt{\frac{(X_i - RM_i)^2}{2}}\right)/2 \qquad \text{Equation 2}$$

SM can be determined using Equation 3:

$$SM_i = \Sigma X_i / n \qquad \text{Equation 3}$$

SS can be determined using Equation 4:

$$SS_i = \sqrt{(SS_{i-1} + (X_i - SM_i)^2)/(n-1)} \qquad \text{Equation 4}$$

TM can be determined using Equation 5:

$$TM_i = (TM_{i-1} + SM_{i-1})/2 \qquad \text{Equation 5}$$

TS can be determined using Equation 6:

$$TS_i = \left(TS_{i-1} + \sqrt{\frac{(X_i - TM_i)^2}{2}}\right)/2 \qquad \text{Equation 6}$$

Orthogonal component 1 (OC1) can be determined using Equation 7:

$$OC1_i = (RM_i + SM_i + TM_i)/3 \qquad \text{Equation 7}$$

Orthogonal component 2 (OC2) can be determined using Equation 8:

$$OC2_i = (RS_i + SS_i + TS_i)/3 \qquad \text{Equation 8}$$

Orthogonal component rollup (OCR) can be determined using Equation 9:

$$OCR_i = OC1_i + OC2_i \qquad \text{Equation 9}$$

There is no "best" encoding for all use cases (Ugly Duckling Theorem limitation). Each set of encoding features used as (x, y) pairs will yield a different but valid view of the same data, with each sensitive to a different aspect of the same data. "R" features tend to group and pull together, "S" features tend to spread out, "T" features tend to congeal data into fewer groups but sub groups tend to manifest with much more organized structure, and "OC" features tend to produce the most general spread of data. "OC" features most resemble PC1 and PC2 of traditional Principal Component Analysis (PCA) without the linear algebra for eigenvectors.

Each feature is now described in more detail with suggested application:

R-type feature—Associates data into closer, less spread groups, guaranteed to be bounded in SV data space if the encoding is bounded and the SV space is similarly bounded (e.g., if ASCII encoding is used and the x and y extent are bounded from [000]-[255]). R-type features are recommended when the dynamic variability in data is unknown (typically initial analysis). This can be refined in subsequent analysis. R-type features will tend to group data more than other features.

S-type feature—Tends to spread the data out more. How the encoded data spreads can be important, so things that stay together after spreading are more likely to really be similar. S-type features produce a potentially unbounded space. S-type features tend to spread data along one spatial grid axis more than another. Note, if the occupied cells in the SV spatial grid fall along a 45-degree line, then the 2 chosen stat types are highly correlated and are describing the same aspects of the data. When this occurs, it is generally suggested that one of the compressive encoding features be changed to a different one.

T-type feature—These compressive encoding features are sensitive to all changes and are used to calculate running mean and running sigma exceedances. T-type features can provide improved group spreading over other features types. T-type features tend to spread data along both axes.

OC-type feature—Orthogonal Components, which are simple fast approximations to PCA (Principal Component Analysis). The OC1 component is the average of RM, SM, and TM, OC2 is the average of RS, SS, and TS, and OCR is the sum of OC1 and OC2.

Note that while two variants of each type of feature are provided (e.g., RS and RM are each a variant of an R-type feature) cross-variants can provide a useful analysis of data items. For example, if an RS or RM is used as feature 1, any of the S-type features, T-type features, or OC-type features can also be used as feature 2. Further, two of the same features can be used on different data. For example, TS on a subset of columns of data from a row in a comma separated values (CSV) data file can form a feature 1, while TS on the same row of data but using a different subset of columns can form a feature 2. Many other variants are possible.

In some embodiments, one or more features can be determined based on a length of a corresponding data item. The length-based features are sometimes called LRM, LRS, LSM, LSS, etc.

The features of Equations 1-9 are order-dependent. The features can be plotted against each other on a grid of cells, at operation 512. The processing circuitry 504 can initialize an SV grid to which the encoded inputs are mapped, such as at operation 512.

Plotted values can be associated or correlated, such as at operation 514. The operation 514 can include forming groups of mapped inputs and determining an extent thereof. More details regarding the operations 508-514 are provided in FIGS. 6-8.

The classifier circuitry 506 can provide a user with a report indicating behavior that is anomalous. An input mapped to a cell that was not previously populated is considered anomalous. If an input is mapped to a cell that already has an input mapped thereto by the features, the input can be considered recognized. Since some applications can be memory limited, an entity can opt to have few cells in an SV grid. For these cases, it can be beneficial to determine an extent that an encoded value is situated away from a center of a cell. If the encoded value is a specified distance away from the center or a center point (e.g., as defined by a standard deviation, variance, confidence ellipse, or the like), the corresponding data item can be considered anomalous. Such embodiments allow for anomaly detection in more memory-limited devices.

The classifier circuitry 506, in some embodiments, can indicate in the report that an input known to be malicious was received. The report can include the input, the group (if applicable) to which the cell is a member, a number of consecutive inputs, a last non-anomalous data item, a subsequent non-anomalous data-item, such as for behavioral analysis or training, or the like. The classifier circuitry 506 can indicate, in the report, different types of anomalies. For example, a type 1 anomaly can indicate a new behavior that falls within an area of regard (AOR). A type 2 anomaly can indicate a new behavior that falls outside of an area of regard. An area of regard can be determined based on one or more prior anomaly detection epochs. In a given epoch, there can be one or more areas of regard. An anomaly detection epoch is a user-defined interval of analyzing a number of inputs, a time range, or the like. The epoch can be defined in the memory 516 and monitored by the processing circuitry 504.

In some embodiments, an event for the report can include a single anomalous behavior. In some embodiments, an event for the report can be reported in response to a specified threshold number of type 2 anomalies.

The classifier circuitry 506 can adjust SV grid parameters. An initial size of an SV grid cell can be determined. In some embodiments, the initial size of the SV grid cell can include dividing the space between (0, 0) and the encoded (x, y) of the first input data item into an N×N SV grid, where N is the initial number of cells on a side of the SV grid (for example, a 16×16 SV grid would break up the distance in x and in y to the first data point from the origin into 16 equal divisions).

As new input data items are introduced and encoded, whenever one fall outside the extent of the SV grid, the N×N SV grid can be increased in size to (N+1)×(N+1) until either the new input data item is included on the resized SV grid, or N becomes equal to the maximum allowed number of SV grid cells on a side of the SV grid. After N becomes a defined maximum SV grid size (for example 64×64), and a new input data item falls off of the current SV grid, the size of each SV grid cell size can be increased so that the SV grid encompasses the new data point.

As either the number of SV grid cells on a side or the overall extent of the SV grid in x (feature 1) and y (feature 2) are increased to encompass new input data items, the SV grid column (Equation 14), SV grid row (Equation 15), and key index value (Equation 16) can be changed to map the populated SV grid cells from the previous SV grid to the newly size one. To accomplish this, the center (x, y) value of each populated SV grid cell can be calculated using the minimum and maximum x and y values and the number of SV grid cells in the previous SV grid, and then mapping the centers and their associated SV grid counts onto the new SV grid using Equations 14, 15, and 16. This is done using the following equations:

$$\text{Row} = \text{int}(\text{Key Value}/(\text{number of cells on side})) \quad \text{Equation 10}$$

$$\text{Col} = \text{Key Value} - \text{int}(\text{Row}*(\text{number of cells on side})) \quad \text{Equation 11}$$

$$\text{Center 1} = x\text{ min} + \text{Col}*(x\text{ range})/(\text{num. col}-1) \quad \text{Equation 12}$$

$$\text{Center 2} = y\text{ min} + \text{Row}*(y\text{ range})/(\text{num. row}-1) \quad \text{Equation 13}$$

The values for Center 1 and Center 2 can then be used in Equations 14, 15, and 16 as Feature 1 and Feature 2 to calculate the new Key Value for each populated cell on the new SV grid.

Figure 6:
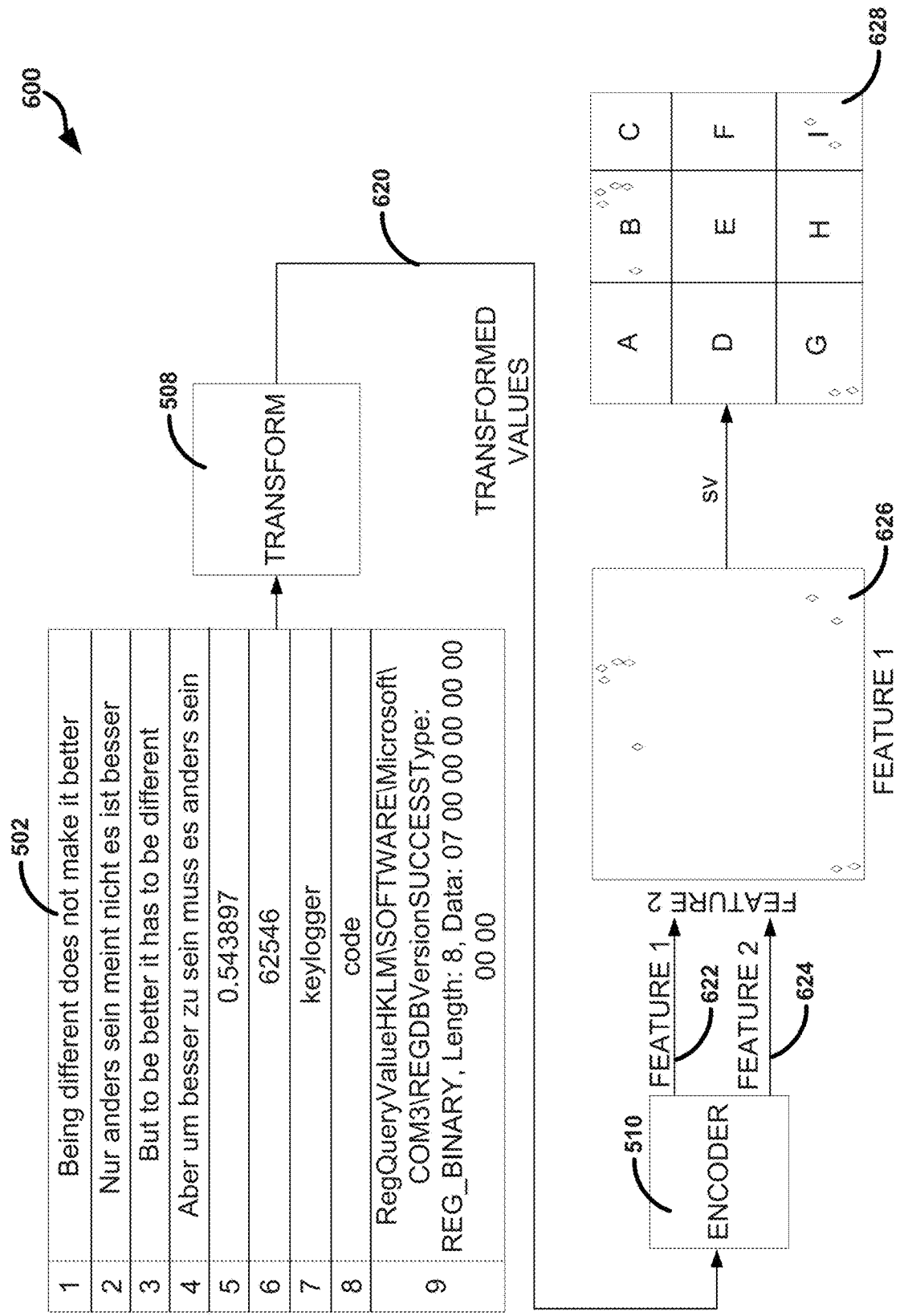
FIG. 6 illustrates, by way of example, a diagram of an embodiment of a method for identifying an anomalous behavior.

FIG. 6 illustrates, by way of example, a diagram of an embodiment of a method 600 for identifying an anomalous behavior. The method 600 as illustrated includes receiving the input 502. The input 502 in FIG. 6 includes nine text strings labelled "1"-"9". Each of the text strings "1"-"9" of the input 502 is respectively transformed to transformed values 620 at operation 508. An example transformation is ASCII encoding which transforms text to numerical values. The transformed values 620 can be used to perform the operation 510. The operation 510 can include determining two features 622, 624 of the input 502 and plotting them against each other to form a feature graph 626. The features 622, 624 can include, for example, RM, RS, SM, SS, TM, and TS, in some embodiments.

Consider the input data item "1". Each character of the input data item "1" can be transformed to an ASCII value. The features can be determined based on the ASCII encoding of the entire string. That is, $X_j$, is the ASCII value of each character and the features are determined over all ASCII encodings of the characters of the input data item "1". As an example, the resultant RM can be feature 1 622 and the resultant RS can be feature 2 624, or vice versa. This is merely an example and any order-dependent feature can be chosen for feature 1 and any order-dependent feature chosen for feature 2. Each of the input data items "1"-"9" can be processed in this manner at operation 508 and 510.

The graph 626 can then be split into cells to form a grid 628. The cells of FIG. 6 are labelled "A"-"I" for illustration (we will introduce Key Values to numerically label the SV grid cells in Equation 16). Inputs 502 mapped to a same cell can be considered similar. Inputs 502 mapped to an empty cell can be considered anomalous. In the grid 628, input data items "1"-"4" (sentences in English and German) are mapped to cell "B", input data items 5-6 (numbers) are mapped to cell "I", and input data items "7-8" (words) are mapped to cell "G". Input data item 9, which is a combination of words, numbers, and other characters, maps to cell "B" indicating that input data item "9" is more like a sentence than a word or number. If a subsequent input data item 502 were to be received and mapped to cell "A", "C", "D", "E", "F", or "H" it can be deemed anomalous, as it is a behavior that has not been received before and is sufficiently different from other behaviors that have been seen previously.

Figure 7:
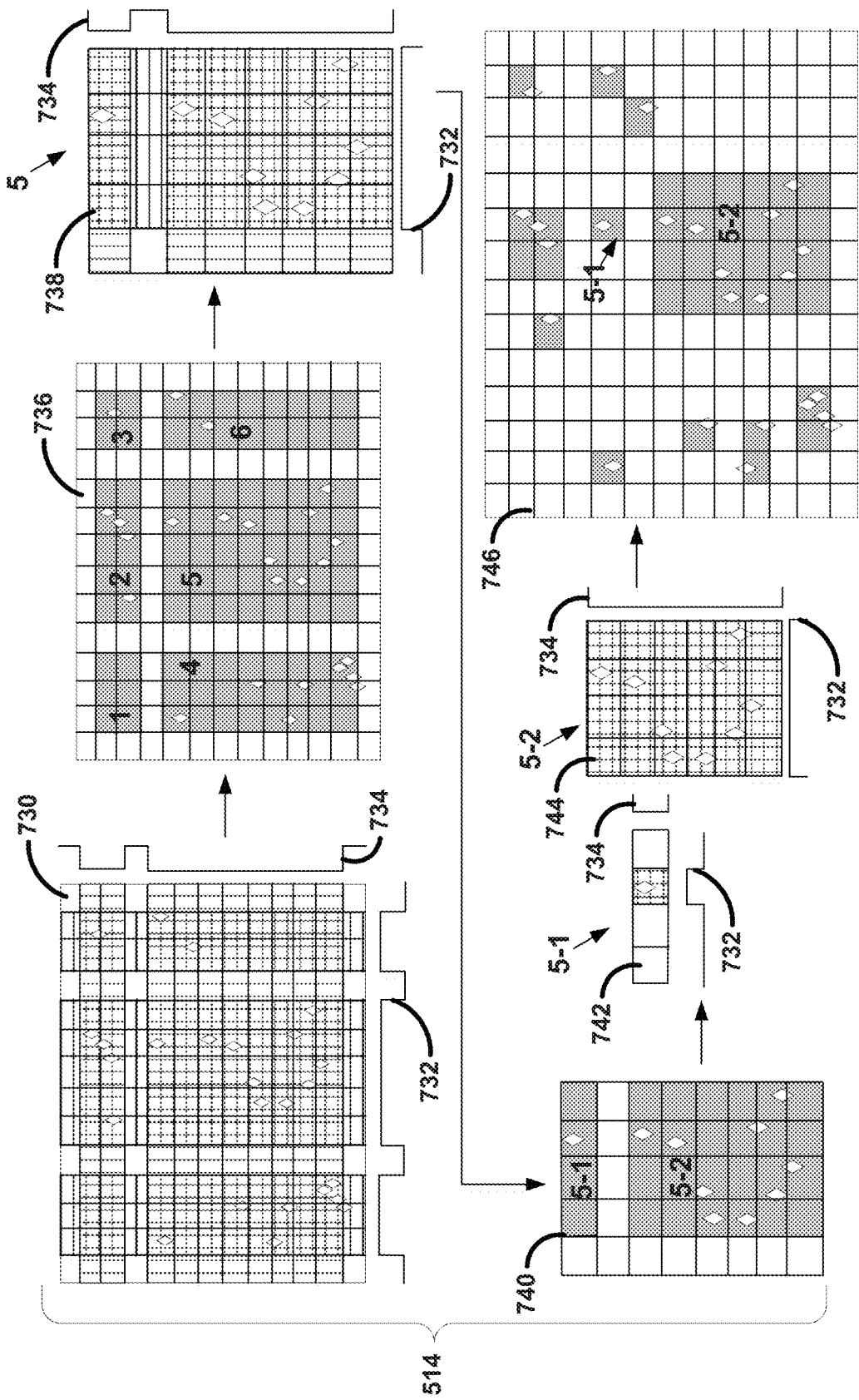
FIG. 7 illustrates, by way of example, a diagram of an embodiment of a grouping operation.

FIG. 7 illustrates, by way of example, a diagram of an embodiment of the operation 514. Encoded inputs ((x, y) points) are represented by diamonds. The operation 514 (sometimes called shadowing for group extraction) can include an iterative process that identifies cells that are populated and aggregates and separates those cells into groups. The iterative process can include:
1) Identifying cells of columns with at least one populated cell at operation 732 (indicated by horizontal hashing in graph 730)
2) Identifying cells of rows with at least one populated cell at operation 734 (indicated by vertical hashing in graph 730)
3) For each cell identified at both (1) and (2) (indicated by cross-hashing in the cell), (a) aggregate with all contiguous cells identified at both (1) and (2), (b) assign aggregated cells to a group, and (c) label the group with a key 4) Repeat (1)-(3) for each group/sub-group until no change.

A graph 736 illustrates the result of a first iteration of performing the operations (1)-(3). After the first iteration, six groups "1"-"6" in FIG. 7 are formed. Next each of the groups "1"-"6" are processed by operations (1)-(3). In FIG. 7, the second iteration is illustrated for group "5". The operations 732 and 734 can be performed on a sub-grid 738 formed by the cells of group "5". A graph 740 illustrates the result of the second iteration of performing the operations (1)-(3). After a second iteration on group "5", two sub-groups "5-1" and "5-2" are formed in the example of FIG. 7.

In the example of FIG. 7, a third iteration of the operations (1)-(3) is performed on the subgroups "5-1" and "5-2". The operations 732 and 734 can be performed on sub-grids 742, 744 formed by the cells of sub-groups "5-1" and "5-2". A graph 746 illustrates the result of the performing all iterations of the operations (1)-(3) and the groups formed therefrom.

As can be seen, whether an input is considered an anomaly is dependent on a size of a cell. The size of the cell can be chosen or configured according to an operational constraint, such as a size of a memory, compute bandwidth, or the like. The size of a cell can be chosen or configured according to a desired level of security. For example, a higher level of security can include more cells, but require more memory and compute bandwidth to operate, while a lower level of security can include fewer cells but require less memory and bandwidth to operate.

In some embodiments, the number of cells can be adaptive, such as to be adjusted during runtime as previously discussed. Related to this adaptive cell size is determining the location of an encoded input in the grid and a corresponding key value associated with the encoded input. An example of determining the location in the grid includes using the following equations (for an embodiment in which feature 1 is plotted on the x-axis and feature 2 is plotted on the y-axis):

$$\text{Col}=\text{int}((\text{feature } 1-x \text{ min})*(\text{num. col}-1)/(x \text{ range})) \quad \text{Equation 14}$$

$$\text{Row}=\text{int}((\text{feature } 2-y \text{ min})*(\text{num. row}-1)/(y \text{ range})) \quad \text{Equation 15}$$

An encoding on the grid, sometimes called key value, can be determined using Equation 16:

$$\text{Key Value}=\text{num. row}*\text{Row}+\text{Col} \quad \text{Equation 16}$$

The "x min", "y min", "x max", and "y max" can be stored in the memory 516. Other values that can be stored in the memory 516 and relating to the grid of cells include "max grid size", "min grid size", or the like. These values can be used by the processing circuitry 504 to determine "x range", "num. col.", "y range", or "num. row", such as to assemble the grid of cells or determine a key value for a given encoded input (e.g., (feature 1, feature 2)).

A series of key values representing sequential inputs can be stored in the memory 516 and used by the classifier circuitry 506, such as to detect malicious (not necessarily anomalous) behavior. A malicious or other behavior of interest can be operated on by the processing circuitry 504 and the key values of the behavior can be recorded. The key values can be stored and associated with the malicious behavior. Key values subsequently generated by the processing circuitry 504 can be compared to the key values associated with the malicious behavior to detect the malicious behavior in the future.

Figure 8:
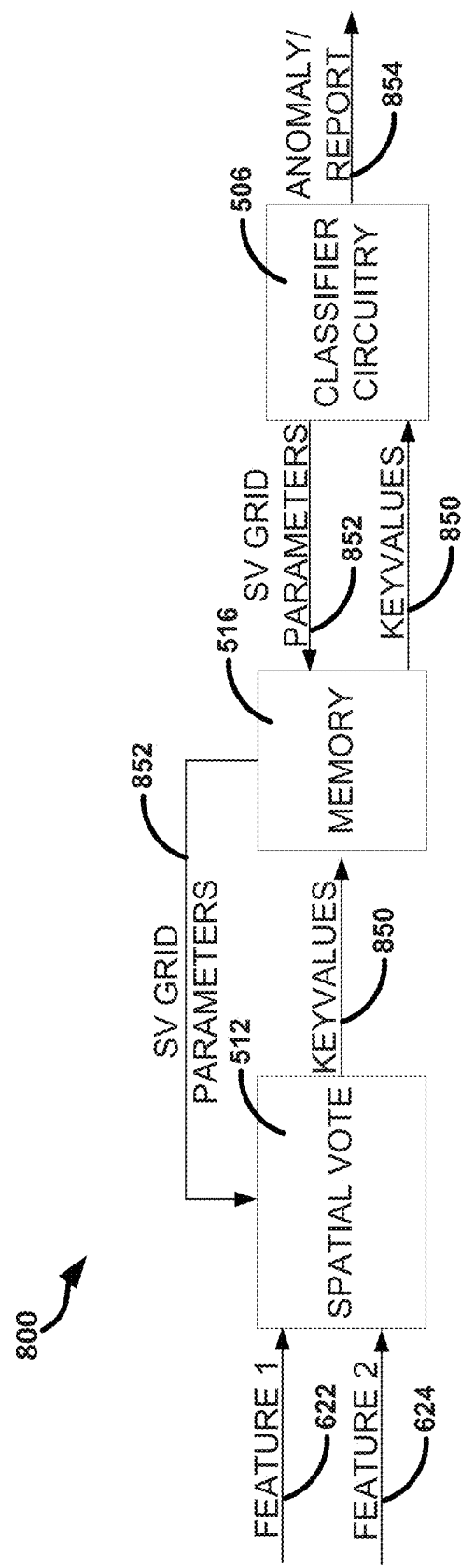
FIG. 8 illustrates, by way of example, a diagram of an embodiment of a system for anomaly detection.

FIG. 8 illustrates, by way of example, a diagram of an embodiment of a system 800 for anomaly detection. The system 800 includes an exploded view diagram of a portion of the system 500. The system 800 as illustrated includes the operation 512 of the processing circuitry 504, the memory 516, and the classifier circuitry 506. The operation 512 determines key values 850 based on SV grid parameters 852 from the memory 516 and features 622, 624 determined by the processing circuitry 504.

The key values in the memory 516 can allow for F-testing, t-testing, or Z-score analysis, such as by the classifier circuitry 506. These analyses can help identify significant columns and cells. The classifier circuitry 506 can provide event and pre-event logs in a report 854, such as for further analysis. The report 854 can provide information on which column or cell corresponds to the most different behavior.

In some cases, it is desirable to have a fully differentiable equation that represents the data. Such differentiable equations are useful for modeling dynamical systems such as those that are based on coupled measurement sets or those which change as a function of one or more of the input variables.

The Turlington function is defined in Equation 17, where d is a fitting parameter, for example, d=0.001, and N is the number of data points:

$$Turlington\ (x) = y_1 + \frac{y_2 - y_1}{x_2 - x_1} * (x - x_1) + \quad \text{Equation 17}$$

$$\sum_{j=2}^{N-1} d\left(\frac{y_{j+1} - y_j}{x_{j+1} - x_j} - \frac{y_j - y_{j-1}}{x_j - x_{j-1}}\right) \log_{10}\left(1 + 10^{\frac{x - x_j}{d}}\right)$$

Equation 18 defines the first derivative of the Turlington function, which is referred to as the first order Handley differential operator and is given by:

$$dHandley/dx = \frac{y_2 - y_1}{x_2 - x_1} + \quad \text{Equation 18}$$

$$\sum_{j=2}^{N-1}\left(\frac{y_{j+1} - y_j}{x_{j+1} - x_j} - \frac{y_j - y_{j-1}}{x_j - x_{j-1}}\right)\left(10^{\frac{x - x_j}{d}} / \left(1 + 10^{\frac{x - x_j}{d}}\right)\right)$$

Equation 19 defines the $n^{th}$ order Handley differential operator, where n is a positive integer and is given by:

$$d^n Handley/dx^n = \quad \text{Equation 19}$$

$$B(n) + \sum_{j=2}^{N-1} \sum_{i=1}^{n} \frac{(-1)^{i+1}}{d^{n-1}} \left(\frac{y_{j+1} - y_j}{x_{j+1} - x_j} - \frac{y_j - y_{j-1}}{x_j - x_{j-1}}\right)$$

$$\left(10^{\frac{x - x_j}{d}} / \left(1 + 10^{\frac{x - x_j}{d}}\right)\right) \ln(10)^{n-1} \Psi_{n,i}$$

In Equation 19, the following apply:

$$B(1) = \frac{y_2 - y_1}{x_2 - x_1},\ B(n) = 0\ \text{if}\ n > 1\ \Psi_{n,i} = \sum_{\substack{j=i-1 \\ j \neq 0 \\ j \neq n}}^{i} j\Psi_{n,i}$$

So if one constructs the Handley differential operator of the data using the $2^{nd}$ derivative form (n=2), one can automatically obtain the analytical integral of the data by setting n=1, or the analytical $j^{th}$ order derivative of the data by setting n=j+2.

To pre-initialize, one assumes the first two points occur at x=−1 and x=0 with y values of 0 respectively, and pre-calculate the initial Handley differential operator term and hardwire it as a starting term enabling the first live data point to generate the first new derivative term shown in Equation 19.

For some embedded applications, the natural log (ln) term can be replaced with its Taylor series expansion.

Figure 9:
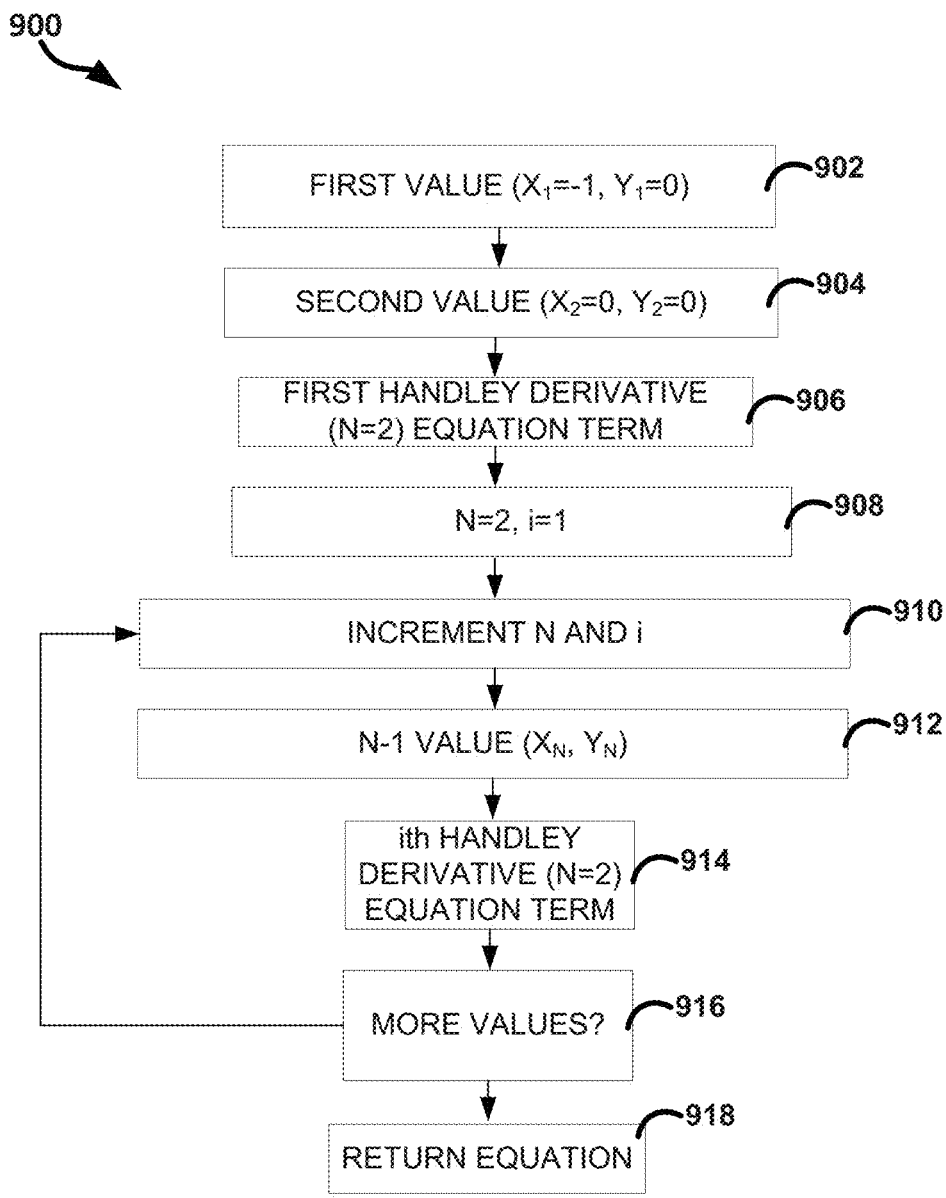
FIG. 9 illustrates, by way of example, a diagram of an embodiment of method of generating equation(s) modeling data sequences as continuous analytical function(s) in piecewise steps.

FIG. 9 illustrates a flow chart of a method 900 for generating the Handley differential operator, such as can be used for behavior monitoring. The method 900 can be implemented at one or more computing machines, for example, the computing machine 1000.

At operation 902, upon receiving a set of measurements associated with actual device behavior, the computing machine sets the first value ($x_1$=−1, $y_1$=0). At operation 904, the computing machine sets the second value ($x_2$=0, $y_2$=0).

At operation 906, the computing machine computes the first Handley differential operator (n=2) equation term. At operation 908, the computing machine sets N=2 and i=1.

At operation 910, the computing machine increases N by 1 and increases i by 1. At operation 912, the computing machine computes the N−1 value ($x_N$, $y_N$).

At operation 914, the computing machine computes, based on the computed Handley differential operator equation terms and the received set of measurements, the $i^{th}$ Handley derivative (n=2) equation term. At operation 916, the computing machine determines if more values are to be computed. If more values are to be computed, the method 900 returns to operation 910. If no more values are to be computed, the method 900 continues to operation 918.

At operation 918, upon determining that no more measurements are available, the computing machine outputs the final equation form, which is an equation based on the computed values. After operation 918, the method 900 ends.

The technique can be used as a plugin into a state estimator of a Kalman filter, such as to improve object tracking, noise reduction, or the like. The Kaman filter on its own is inaccurate and does not track well. With the Handley differential operator extrapolated and used to preprocess data fed to the Kalman filter, tracking is greatly improved. Another application of the technique of FIG. 9 is deriving a full set of explanatory data models from a single measured track of an unknown maneuvering target trajectory. The techniques 300 and 900 can help deconvolve all functions, then convolve then back in to match the trajectory. The result is a full aerodynamic model from the trajectory that can estimate shape mass velocity, spin axis rotation, and then change those parameters to predict another trajectory.

Some aspects of the technology disclosed herein could be implemented on a GPU (graphics processing unit), such as a TX2 GPU board (developed by NVIDIA Corporation of Santa Clara, Calif.). Some aspects could be implemented using an ASIC (application-specific integrated circuit) processor or a FPGA (field programmable gate array) processor. In some cases, for instance with the ASIC or FPGA implementation, the Turlington function and its derivatives from the Handley differential operator may be represented in pre-tabulated meta-variable look-up tables (LUTs) for embedded execution. The LUTs may be arranged in series and/or in parallel. Each LUT may receive one or more inputs and may generate an output based on its inputs. In some cases, exported single pass data model terms achieve convolutions in computational memory, rather than explicitly in code. In some cases, left-to-right, column-to-column evaluation of a data model for FPGA processing is implemented.

Some aspects relate to discrete real-time embedded decision architectures. Some aspects are directed to solving the problem of how to achieve information awareness—having the right information at the right time to make critical decisions. One solution is to enable sensors to maintain situational awareness, such as through behavior monitoring. One approach combines fractal math and analytical equations to yield a data model. The data model is combined with spatial voting to yield predictive analytics and anomaly detection.

Modeling may use no compression. Modeling may generate unlimited amounts of higher or coarser resolution data. Models may be fixed in length (measured in SLOC (source lines of code)) regardless of the training data length. In modeling, complicated dynamics of training data are preserved and can be used to generate new data sets. Models may be exported in Ada, Fortran or C++ and may be platform and/or processor independent.

Compression may use data preprocessing and/or encoding. Decompression may yield the original data set. Compressed data sets may not be of fixed length and the length may be driven by the training data. Training data dynamics might not be captured or preserved. Original data may, in some cases, be lost and not directly accessible without decompression.

A decision architecture may include classifiers and controllers. The classifier may be a data model network or tree for making a multi-class decision. The controller may be a data model making a decision between two other data model branches. Siphoning at the classifier level may, in some cases, lead to convergence with a fixed number of classifiers. The classifiers may be analyzed to determine which are the most similar. The controller network may be used to make a decision about which classifier to use. New data may cause the addition of a new branch, which does not require retraining of the entire network. In some cases, a classifier that is most similar to the new branch may be selected.

Embedded data model controllers may be used in the context of an unmanned aerial vehicle (UAV). The UAV sensor surveys the area and assesses the situation. It reports and telemeters significant anomalies. The UAV forms a hypothesis and shares it with the network. It generates a data model of nominal behaviors. The existence of a hypothesis forms a disembodied domain expert. There is situational awareness of the cyber-scene. The UAV provides substantiating evidence (raw data) upon demand to the network. As more and more data is taken and/or network feedback occurs, the hypothesis evolves. The discrete embedded form of the nominal data model (spatial voting (SV) grid) is updated.

The technology may be used in the data preservation context. The problem is the inability to store instrument data to perform equipment diagnostics and integrated mission assessment. One scheme includes non-filed accessible limited format data logging instructions. Some equipment has no internal data logging capacity. In other equipment, data memory enables only the most recent short histories to be saved. Data might not be accessible for in-field diagnostics. One problem is that nominal sensor conditions change during the mission due to changes in aircraft, such as equipment failure, equipment loss, or equipment interference. One solution to the above problems is a pilot specified alarm protocol (PSAP) system.

Data includes measurements prior to descriptive feature extraction (e.g., engine temperature, altitude, airspeed, etc.). Features include characteristics derived from the data (e.g., mean, standard deviation, skewness, kurtosis, etc.). Data models include mathematical relationships between features.

Some aspects use the data model that is derived from a bottoms up self-organizing process into the multivariable continuous function that explains the target data do be predicted from the available sensor measurements. The explanation might, in some cases, be exact (100%) accurate (specificity of 1 and sensitivity of 1). If the machine is unable to do so, it can conclude that it lacks sufficient relevant sensors of adequate type placement sensitivity. Some aspects may lack orthogonalized features extracted from those sensors and are experiencing over fit bias from data multicollinearity in each case resulting in an "approximation" but not an explanation. In some cases, only an explanation suffices as a testable "hypothesis" explaining all observations.

Some aspects can be coupled with techniques for predicting remaining useful life by using model update frequency to determine at what point physics of failure models should now be accurate in predicting remaining useful life or allow data model approximations to such physics based models to be derived that are tuned to the specific mission system. This methodology may be used for a rocket (e.g., Phalanx Rocket, V22, Patriot DPICC, and other fielded weapon platforms recurring maintenance and subject to Whole life Cycle Predictive Maintenance).

In experimental research designs, it may be beneficial to eliminate the effects of spurious, intervening, and antecedent variables. In the most basic model, cause (X) leads to effect (Y). But there could be a third variable (Z) that influences (Y), and X might not be the true cause at all. Z is said to be a spurious variable and is, in some cases, controlled. The same is true for intervening variables (a variable in between the supposed cause (X) and the effect (Y)), and anteceding variables (a variable prior to the supposed cause (X) that is the true cause). When a third variable is involved and has not been controlled, the relation is said to be a zero order relationship. In most practical applications of experimental research designs there are several causes (X1, X2, X3).

In some design schemes, only one of these causes is manipulated at a time. According to some aspects of the technology disclosed herein, an explanatory data model leverages the Kolmogorov-Gabor multivariate $O(3^n)$ functional composition process created by Ivakhnenko and called Group Method of Data Handling (GMDH). GMDH is an example of a true deep learning conventional neural network. It requires no a priori network specification of layers, activation functions, nor interconnection types and rather discovered these from bottom up as the final functional equation self-organized.

GMDH is a family of abductive algorithms for computer-based mathematical modeling of multi-parametric datasets that features fully automatic structural and parametric optimization of models.

GMDH is used in such fields as data mining, knowledge discovery, prediction, complex systems modeling, optimization and pattern recognition. In some cases, GMDH neural network perform better than the classical forecasting algorithms such as Single Exponential Smooth, Double Exponential Smooth, ARIMA and back-propagation neural network.

GMDH algorithms are characterized by abductive procedure that performs sorting-out of self-organizing multinomial models and selecting the best solution by means of Information Theoretic criterion derived from the data be explained itself.

A GMDH model with multiple inputs and one output is a subset of components of the base function:

$$Y(x_1, \ldots, x_n) = a_0 + \sum_{i=1}^{m} a_i f_i$$

In the base function above, $f$ are elementary functions dependent on different sets of inputs, a are coefficients and m is the number of the base function components.

In order to find the best solution, GMDH algorithms consider various component subsets of the base function called partial explainer models. Coefficients of these models are estimated by the least squares method. GMDH algorithms gradually increase the number of partial explainer model components and find a model structure with optimal complexity indicated by the minimum value of an external criterion. This process is called the self-organization of models.

One base function used in GMDH is the Kolmogorov-Gabor polynomial:

$$Y(x_1, \ldots, x_n) = a_0 + \sum_{i=1}^{n} a_i x_i + \sum_{i=1}^{n} \sum_{j=i}^{n} a_{ij} x_i x_j + \sum_{i=1}^{n} \sum_{j=i}^{n} \sum_{k=j}^{n} a_{ijk} x_i x_j x_k + \ldots$$

The resulting models are also known as polynomial neural networks. This approach from the very beginning was a computer-based method so, a set of computer programs and algorithms were the primary practical results achieved at the base of the new information theoretic principles.

This new version generalized with insights gained from Information Theory and nonlinear Taylor Series combined with Fractal Theory, Chaos Theory methods has yield a vastly improved and robust Data Modeling Process that includes Gene Expression Programming to facilitate compact form representation of Explanatory Data Models and assures both interpolation and extrapolation are possible from the same coupled equations.

The Data Modeling capability enables for Explanatory Data Modeling with specificity and sensitivity=1 to be maintained and leverages the concept of introducing abductive reasoning (the creation of plausible hypothesis as partial explainers and enabling functional convolution into embedded functional equations, i.e. functions whose variables are themselves functions).

Some aspects relate to the derivation of Explanatory Data Models of system variable interactions to predict target system state with analytical equations that can be experimentally used for Modeling and Simulation.

Some aspects relate to the explanatory model boundary decision to drive where to sample more data at fractal boundaries where system variable interaction is very non-linear and therefore low confidence in reliable prediction.

Some aspect relate to the ability for the explanatory Data Model to act as a hypothesis capable of explaining all observed data with specificity and sensitivity equal to one.

Some aspects leverage software or hardware programmed using one or more of: C, CUDA, and a TX2 GPU board. Some aspects implement the algorithms disclosed herein using one or more of: Python, C, CUDA, and/or T2 GPU enabling full embedded processing and functional decomposition.

In some aspects, the subject matter discussed herein can be used in place of a neural network, or other ML model. For example, the model generated by the technique discussed can be operated to determine a model. The model can then be used to determine a value based on a future input. The model can be used in place of the neural network, or other ML model. The model, as it is just an equation, can be more efficient than ML techniques in terms of both memory and processing bandwidth consumed.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA), graphics processing unit (GPU), or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules may provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and may operate on a resource (e.g., a collection of information).

The transformation of encoded data into a 2D representation forms an "image" of SV grid data. This image may be operated on using conventional image processing techniques including convolution operators, foreground background segmentation, edge detection, texture characterization, morphological image operators, and image algebra including affine transformations and projections, among others. The image format also enables optical processing and optical computer techniques to be applied enabling spatial matched filtering, holography, Fourier, Gabor, and wavelet transformation, optical neural network connectionist architecture representation, complementary metal oxide semiconductor (CMOS) focal plane array integrated monolithic hybrid meta-material structures (including but not limited to non-linear optically active crystals and nano-structures) to be used for encoding and reading out SV patterns as well as transforming and partitioning the data thereby represented using purely optical and meta-material embodiments.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, (e.g., a computer program tangibly embodied in an information carrier, such as in a machine-readable medium for execution by, or to control the operation of, data processing apparatus, such as a programmable processor, a computer, or multiple computers).

A computer program may be written in any form of programming language, including compiled or interpreted languages, and it may be deployed in any form, including as a stand-alone program or as a module, subroutine, or other unit suitable for use in a computing environment. A computer program may be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations may also be performed by, and apparatus of example embodiments may be implemented as, special purpose logic circuitry, e.g., an FPGA, GPU, ASIC, or optical computer or hybrid meta-material element.

The computing system may include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium (e.g., Storage Device)

Figure 10:
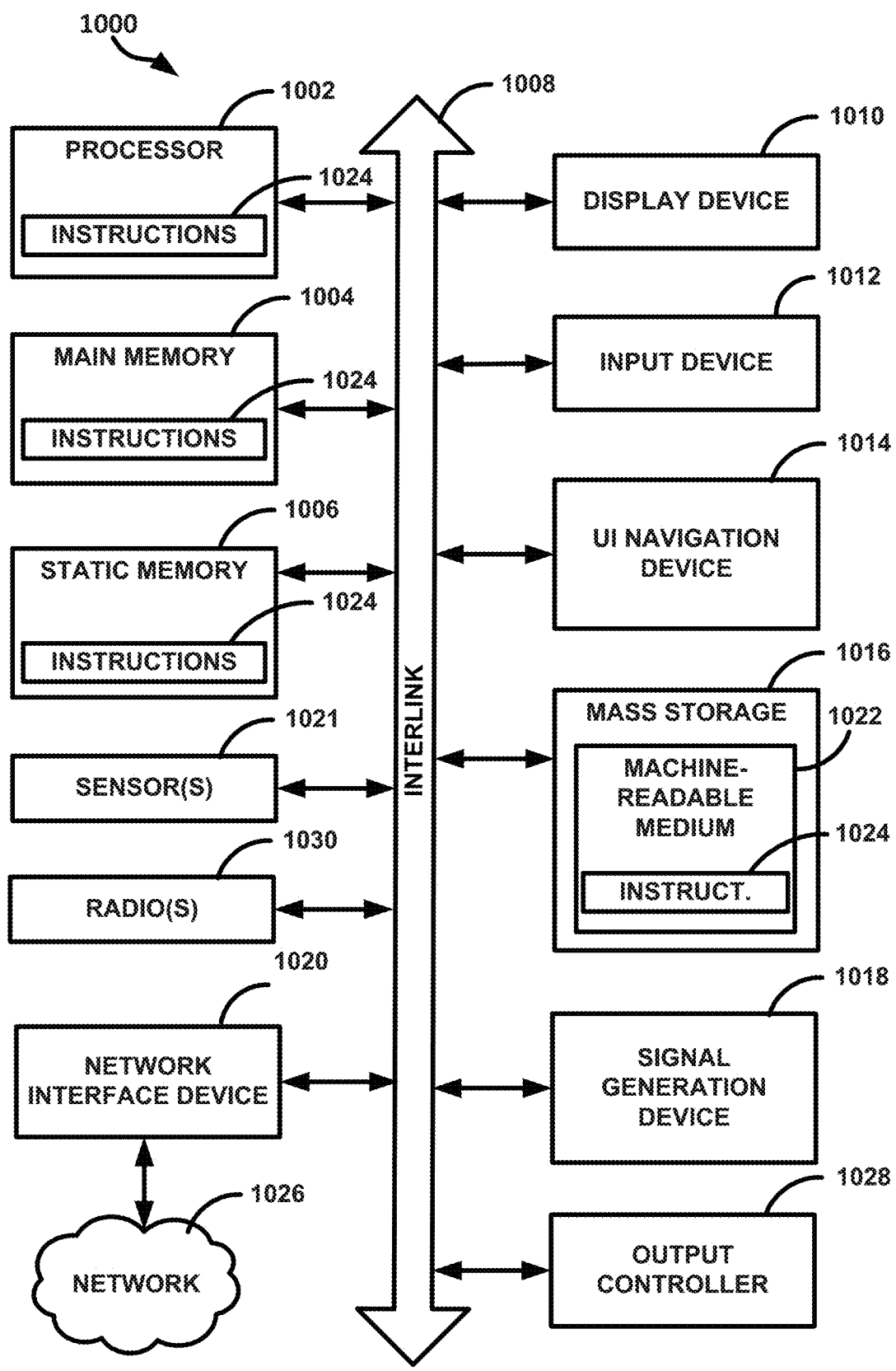
FIG. 10 illustrates, by way of example, a diagram of an embodiment of a machine on which one or more of the methods can be performed.

FIG. 10 illustrates, by way of example, a block diagram of an embodiment of a machine in the example form of a computer system 1000 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., processing circuitry, such as can include a central processing unit (CPU), a graphics processing unit (GPU), field programmable gate array (FPGA), other circuitry, such as one or more transistors, resistors, capacitors, inductors, diodes, regulators, switches, multiplexers, power devices, logic gates (e.g., AND, OR, XOR, negate, etc.), buffers, memory devices, or the like, or a combination thereof), a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard), a user interface (UI) navigation device 1014 (e.g., a mouse), a disk drive unit 1016, a signal generation device 1018 (e.g., a speaker), a network interface device 1020, and radios 1030 such as Bluetooth, WWAN, WLAN, and NFC, permitting the application of security controls on such protocols.

Machine-Readable Medium

The disk drive unit 1016 includes a machine-readable medium 1022 on which is stored one or more sets of instructions and data structures (e.g., software) 1024 embodying or utilized by any one or more of the methodologies or functions described herein. The instructions 1024 may also reside, completely or at least partially, within the main memory 1004 and/or within the processor 1002 during execution thereof by the computer system 1000, the main memory 1004 and the processor 1002 also constituting machine-readable media.

While the machine-readable medium 1022 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks or hybrid meta-materials.

Transmission Medium

The instructions 1024 may further be transmitted or received over a communications network 1026 using a transmission medium. The instructions 1024 may be transmitted using the network interface device 1020 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, user equipment (UE), article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method implemented at one or more computing machines, the method comprising:
receiving, as input, a plurality of data examples;
while a layer number is less than or equal to a maximum layer number and while a previously unselected variable in a layer of layers corresponding to the layer number is available:
selecting a variable from the data examples in a layer corresponding to the layer number;
computing a multivariable linear regression for the currently selected variable combination based on the data examples;
if an error for the multivariable linear regression is less than that for at least one of a best M variables for a next layer:
adding the selected variable combination to the best M variables; and
comparing the error against stopping criteria;
upon satisfying the stopping criteria, compiling and outputting computer program source code for a first digital model based on the layers and the best M variables;
upon not satisfying the stopping criteria, adding the best M variables to a set of inputs for a next layer of the layers; and
increment the layer number; and
compiling and outputting computer program source code for a second digital model based on the layers and the best M variables; and
converting the first or second digital model to a spatial voting grid, and monitoring behavior of a device using the spatial voting grid.

2. The method of claim 1, further comprising:
providing the first or second digital model to a model-based training algorithm; and
training the model-based training algorithm using the first or second digital model.

3. The method of claim 1, wherein the stopping criteria comprise the error being less than a standard deviation of a predetermined variable in the data examples.

4. The method of claim 1, wherein the stopping criteria comprise the error being less than a standard deviation of a predetermined variable in the data examples divided by a number of samples for that predetermined variable.

5. The method of claim 1, wherein the stopping criteria comprise one of the best M variables being a function of previous layer outputs.

6. The method of claim 1, further comprising:
computing a modified Z-Score ($z^*$-score) for at least one of the data examples, wherein the $z^*$-score is computed by taking a difference of the at least one of the data examples and a mean of the data examples, and dividing the difference by an average deviation of the data examples.

7. The method of claim 1, wherein the error is an residual sum of squares (RSS) error.

8. The method of claim 1, wherein the plurality of data examples comprise input/output (I/O) pairs.

9. An apparatus comprising:
processing circuitry and memory;
the processing circuitry to perform operations comprising:
receiving, as input, a plurality of data examples;
setting a layer number (N) to 1;
while the layer number is less than or equal to a maximum layer number and while a previously unselected variable combination in a layer of layers corresponding to the layer number is available:
selecting a variable combination from the data examples in a layer corresponding to the layer number;
computing a multivariable linear regression for the currently selected variable combination;
if an error for the multivariable linear regression is less than that for at least one of a best M variable combinations for a next layer:
adding the selected variable combination to the best M variable combinations, wherein M is a positive integer; and
running a test of the error against stopping criteria;
upon satisfying the stopping criteria compiling and outputting computer program source code for a first digital model based on the layers and the M best variables;
upon not satisfying the stopping criteria, adding the best M variable combinations to a set of inputs for a next layer of the layers; and
increment the layer number; and
compiling and outputting computer program source code for a second digital model based on the layers and the M best variables; and
converting the first or second digital model to a spatial voting grid, and monitoring behavior of a device using the spatial voting grid.

10. The apparatus of claim 9, the operations further comprising:
providing the first or second digital model to a model-based training algorithm; and
training the model-based training algorithm using the first or second digital model.

11. The apparatus of claim 9, wherein the stopping criteria comprise the error being less than a standard deviation of a predetermined variable in the data examples.

12. The apparatus of claim 9, wherein the stopping criteria comprise the error being less than a standard deviation of a predetermined variable in the data examples divided by a number of samples for that predetermined variable.

13. The apparatus of claim 9, wherein the stopping criteria comprise one of the best M variable combinations being a function of previous layer outputs.

14. The apparatus of claim 9, the operations further comprising:
computing a $z^*$-score for at least one of the data examples, wherein the $z^*$-score is computed by taking a difference of the at least one of the data examples and a mean of the data examples, and dividing the difference by an average deviation of the data examples.

15. The apparatus of claim 9, wherein the error is a residual sum of squares (RSS) error.

16. The apparatus of claim 9, wherein the plurality of data examples comprise input/output (I/O) pairs.

17. A non-transitory machine-readable medium storing instructions which, when executed by processing circuitry of one or more machines, cause the processing circuitry to perform operations comprising:
receiving, as input, a plurality of data examples;
setting a layer number (N) to 1;
while the layer number is less than or equal to a maximum layer number and while a previously unselected variable combination in a layer of layers corresponding to the layer number is available:

selecting a variable combination from the data examples in a layer corresponding to the layer number;

computing a multivariable linear regression for the currently selected variable combination;

if an error for the multivariable linear regression is less than that for least one of a best M variable combinations for a next layer:

adding the selected variable combination to the best M variable combinations, wherein M is a positive integer; and running a test of the error against stopping criteria;

upon satisfying the stopping criteria, outputting computer program source code for a first digital model based on the layers;

upon not satisfying the stopping criteria, adding the best M variable combinations to a set of inputs for a next layer of the layers; and increment the layer number; and compiling and outputting computer program source code for a second digital model based on the layers and the M best variables; and converting the first or second digital model to a spatial voting grid, and monitoring behavior of a device using the spatial voting grid.

18. The machine-readable medium of claim 17, the operations further comprising:

providing the first or second digital model to a model-based training algorithm; and training the model-based training algorithm using the first or second digital model.

19. The machine-readable medium of claim 17, wherein the stopping criteria comprise the error being less than a standard deviation of a predetermined variable in the data examples.

20. The machine-readable medium of claim 17, wherein the stopping criteria comprise the error being less than a standard deviation of a predetermined variable in the data examples divided by a number of samples for that predetermined variable.

21. The machine-readable medium of claim 17, wherein the stopping criteria comprise one of the best M variable combinations being a function of previous layer outputs.

22. The machine-readable medium of claim 17, the operations further comprising:

computing a z*-score for at least one of the data examples, wherein the z*-score is computed by taking a difference of the at least one of the data examples and a mean of the data examples, and dividing the difference by an average deviation of the data examples.

23. The machine-readable medium of claim 17, wherein the error is a residual sum of squares (RSS) error.

24. The machine-readable medium of claim 17, wherein the plurality of data examples comprise input/output (I/O) pairs.

* * * * *